US009065706B2

(12) United States Patent
Koinuma et al.

(10) Patent No.: US 9,065,706 B2
(45) Date of Patent: Jun. 23, 2015

(54) INFORMATION PROCESSING APPARATUS, COMPUTER-READABLE RECORDING MEDIUM, AND CONTROL METHOD

(75) Inventors: Hideyuki Koinuma, Yokohama (JP); Go Sugizaki, Machida (JP); Toshikazu Ueki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 157 days.

(21) Appl. No.: 13/611,840

(22) Filed: Sep. 12, 2012

(65) Prior Publication Data

US 2013/0170334 A1 Jul. 4, 2013

(30) Foreign Application Priority Data

Dec. 28, 2011 (JP) .................................. 2011-290024

(51) Int. Cl.
H04L 29/14 (2006.01)

(52) U.S. Cl.
CPC ....................................... H04L 29/14 (2013.01)

(58) Field of Classification Search
None
See application file for complete search history.

(56) References Cited

U.S. PATENT DOCUMENTS

| 5,890,217 | A  | * | 3/1999  | Kabemoto et al. ............ 711/141 |
| 6,038,674 | A  | * | 3/2000  | Sasaki et al. .................. 713/500 |
| 6,088,770 | A  | * | 7/2000  | Tarui et al. .................... 711/148 |
| 6,092,173 | A  | * | 7/2000  | Sasaki et al. .................... 712/14 |
| 6,546,471 | B1 | * | 4/2003  | Tarui et al. .................... 711/148 |
| 7,243,257 | B2 | * | 7/2007  | Kawaguchi .................... 714/4.2 |
| 7,428,210 | B2 |   | 9/2008  | Saika |
| 8,255,601 | B2 | * | 8/2012  | Sugizaki ........................ 710/107 |
| 2003/0225981 | A1 |   | 12/2003 | Castelli et al. |
| 2005/0005200 | A1 | * | 1/2005  | Matena et al. .................. 714/38 |
| 2006/0248283 | A1 | * | 11/2006 | Galchev et al. ............... 711/141 |
| 2010/0325397 | A1 |   | 12/2010 | Craske |
| 2013/0159638 | A1 | * | 6/2013  | Koinuma et al. ............. 711/154 |

FOREIGN PATENT DOCUMENTS

| JP | 8-320827 A   | 12/1996 |
| JP | 10-55313 A   | 2/1998  |
| JP | 10-116225 A  | 5/1998  |
| JP | 10-240707 A  | 9/1998  |
| JP | 11-168502    | 6/1999  |

(Continued)

OTHER PUBLICATIONS

Korean Office Action mailed Oct. 21, 2013 for corresponding Korean Application No. 10-2012-0117294, with Partial English-language Translation.

(Continued)

*Primary Examiner* — Anh-Vu Ly
*Assistant Examiner* — Hashim Bhatti
(74) *Attorney, Agent, or Firm* — Fujitsu Patent Center

(57) ABSTRACT

An abnormality detection unit provided in at least one node among a plurality of nodes included in an information processing apparatus detects abnormality in a data transmission path of data transmission using a shared memory area sharable in a single node and other node, which is included in the storage unit provided in the single node or other nodes. An error information generation unit provided in the single node generates error information, based on the abnormality detected by the abnormality detection unit, and generates an interrupt with respect to a processor within a self node. The processor provided in the single node performs recovery processing, based on the error information according to the interrupt.

13 Claims, 34 Drawing Sheets

(56) References Cited

FOREIGN PATENT DOCUMENTS

| JP | 2001-5683 | A | 1/2001 |
|----|-----------|---|--------|
| JP | 2001-331470 | A | 11/2001 |
| JP | 2002-149622 | A | 5/2002 |
| JP | 2002-366451 | | 12/2002 |
| JP | 2003-330905 | A | 11/2003 |
| JP | 2004-013723 | | 1/2004 |
| JP | 2004-341595 | A | 12/2004 |
| JP | 2006-79161 | A | 3/2006 |
| JP | 2006-285384 | A | 10/2006 |
| JP | 2010-50742 | A | 3/2010 |
| JP | 2013-130976 | A | 7/2013 |
| TW | 200401202 | | 1/2004 |
| TW | 201102929 | | 1/2011 |
| WO | WO 2004/081762 A2 * | | 9/2004 |
| WO | WO-2004-081762 A2 | | 9/2004 |

OTHER PUBLICATIONS

Teodosiu, Dan et al., "Hardware Fault Containment in Scalable Shared-Memory Multiprocessors," ISCA '97, Proceedings of the 24th Annual International Symposium On Computer Architecture, Jun. 2, 1997, pp. 73-84, XP010234341.

Extended European Search Report dated Jan. 7, 2013 for corresponding European Application No. 12187770.8.

Japanese Office Action mailed Dec. 10, 2013 for corresponding Japanese Application No. 2011-290024, with Partial English-language Translation.

Taiwanese Office Action mailed by Taiwan Patent Office and corresponding to Taiwanese Application No. 101133463 on Jul. 29, 2014, with English translation.

Chinese Office Action mailed Feb. 17, 2015 for corresponding Chinese Patent Application No. 201210425451.0, with English Translation, 26 pages.

* cited by examiner

FIG.5

| ADDRESS | VALID | NODE ID | CPUID |
|---|---|---|---|
| #0 | 1 | 1 | 4 |
| #1 | 1 | 1 | 5 |
| #2 | 0 | | |

FIG.6

| BIT | ... | 68 TO 67 | 66 TO 4 | 3 TO 0 |
|---|---|---|---|---|
| | | CKBIT (2) | PRC (63) | UE (4) |

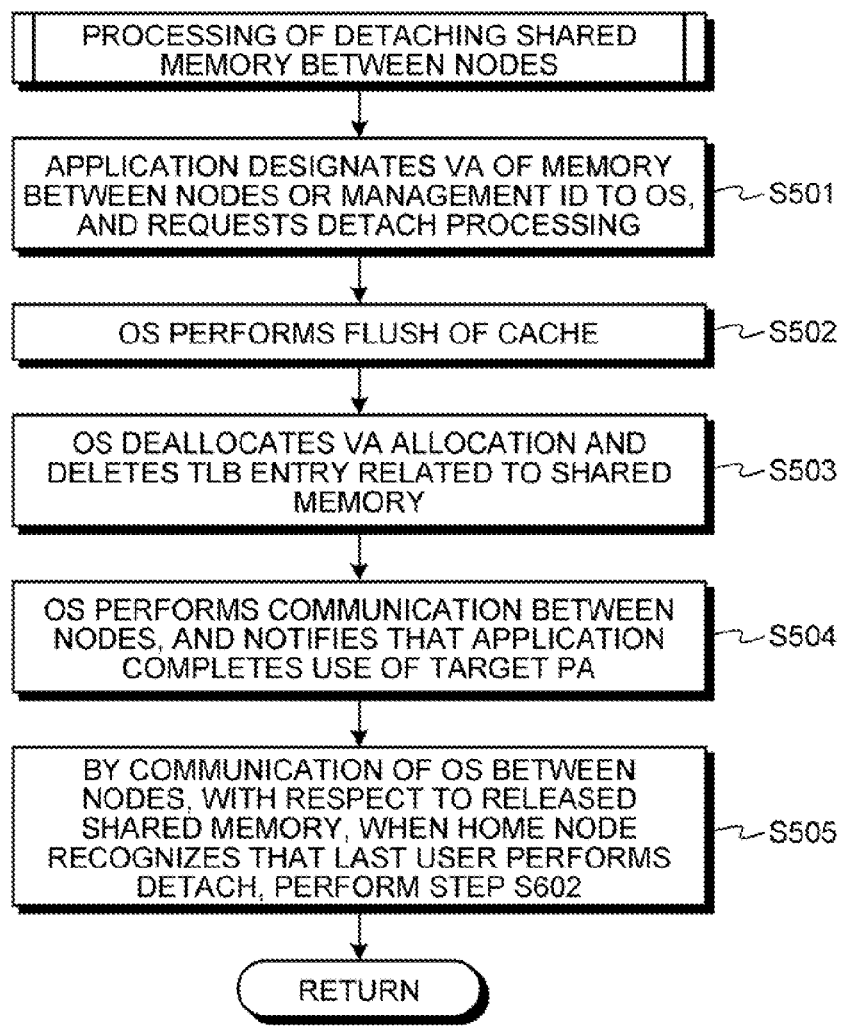
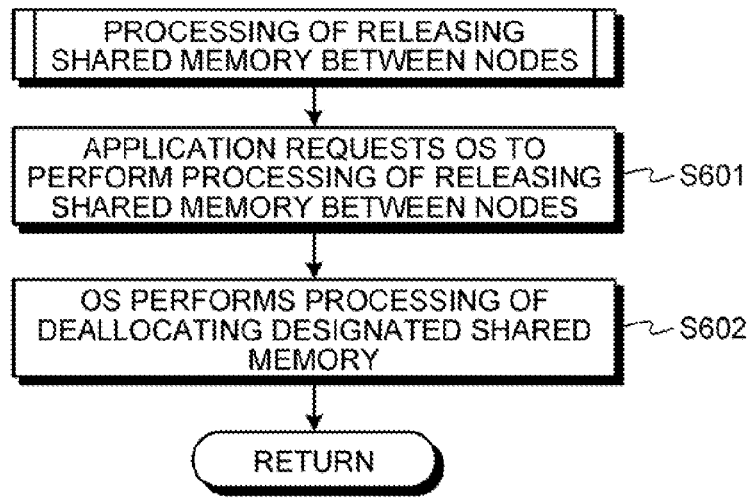

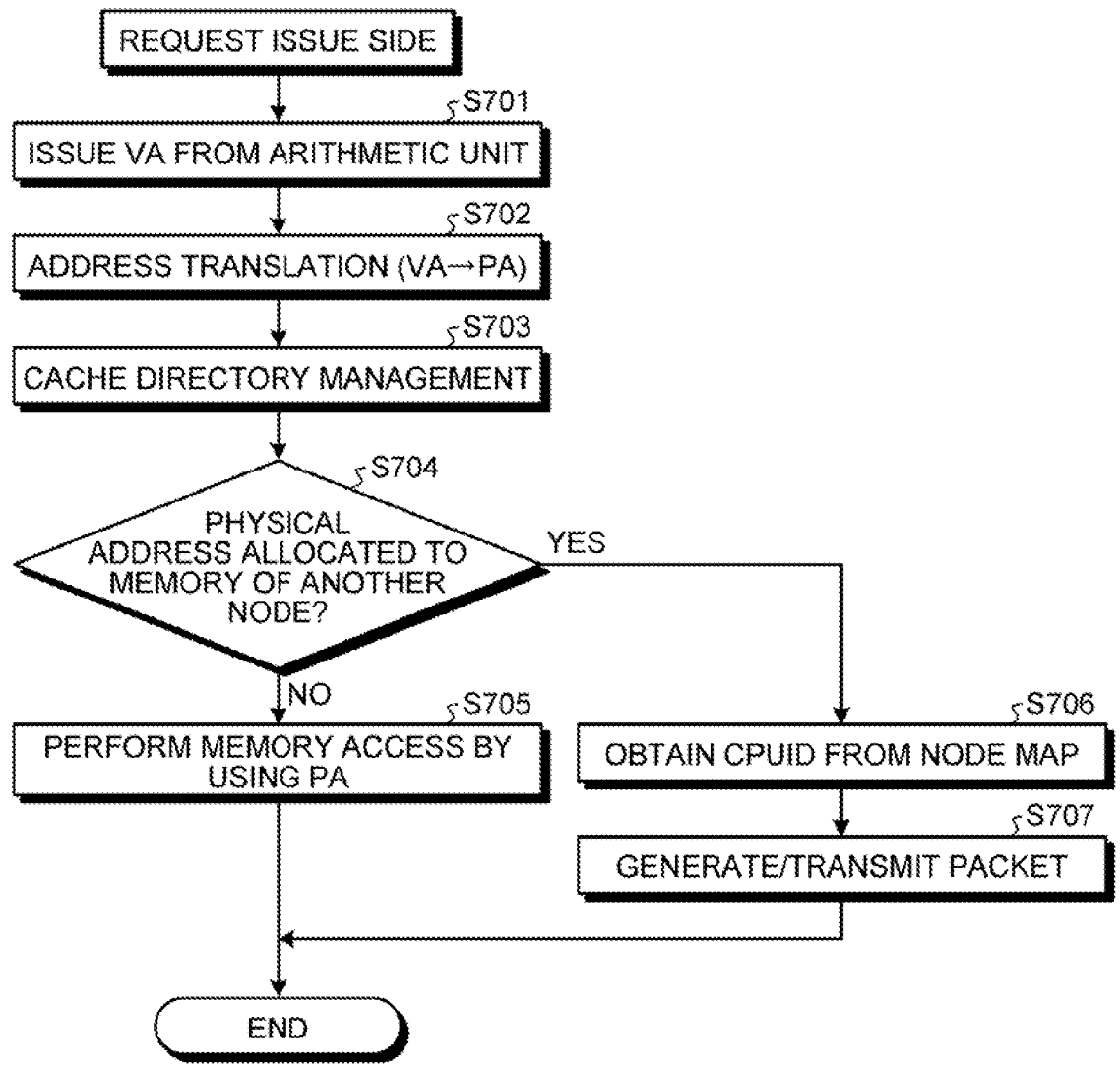

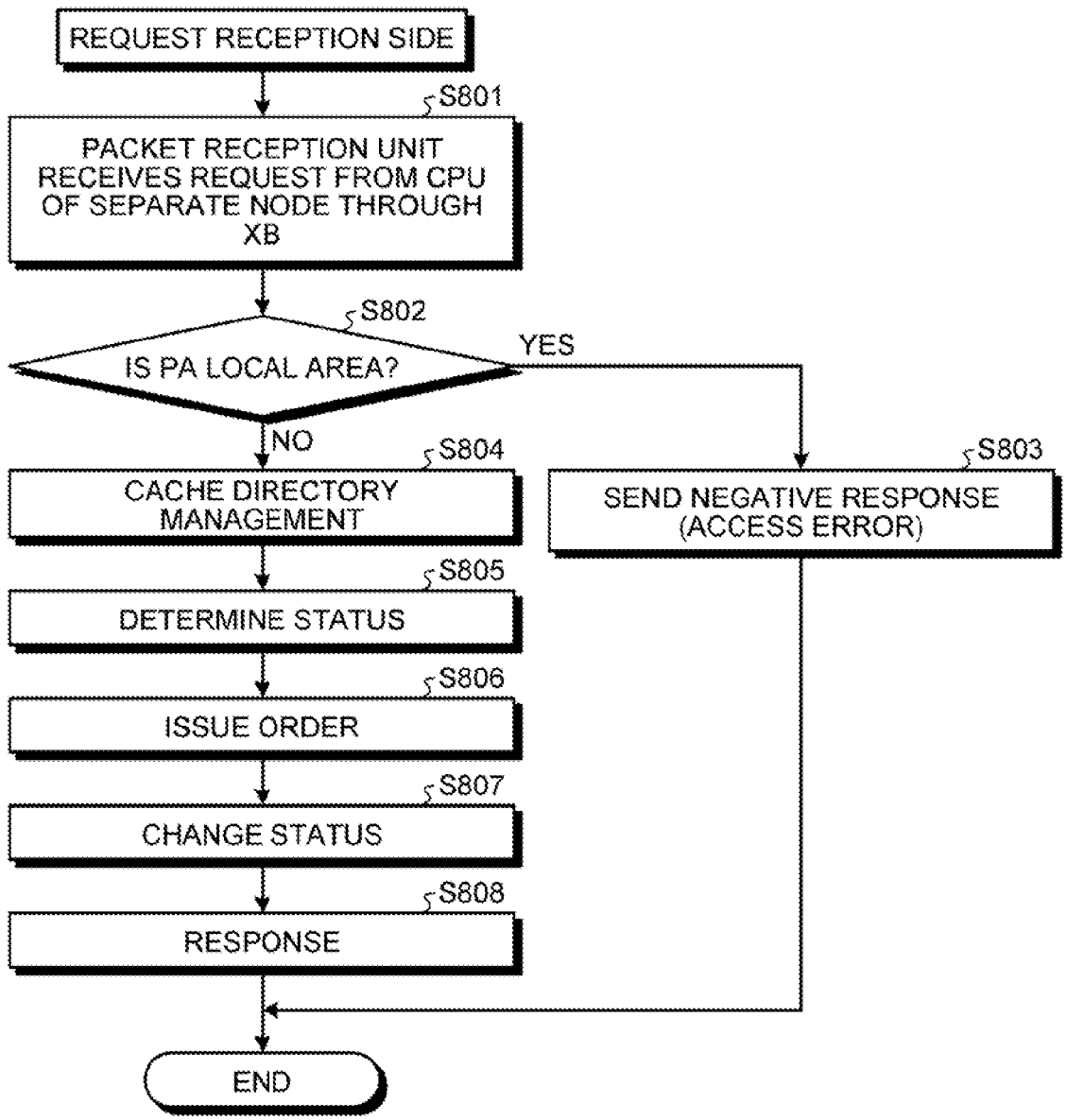

FIG.31

| SHARED MEMORY ADDRESS | PID | ENTRY ADDRESS OF FUNCTION OF SIGNAL HANDLER |
|---|---|---|
| 0x3000 TO 0x4000 | 100 | 0xfff00000 |
| 0x3000 TO 0x4000 | 101 | 0xddd00000 |
| 0x4000 TO 0x5000 | 105 | 0x4000000 |

FIG.39A

| ADDRESS | VALID | NODE ID | CPU ID |
|---|---|---|---|
| #0 | 1 | 0 | 0 |
| #1 | 1 | 1 | 4 |
| #2 | 1 | 1 | 5 |
| #3 | 1 | 2 | 8 |

| ENTRY | VALID | NODE ID | CPU ID |
|---|---|---|---|
| #0 | 1 | 0 | 0 |
| #1 | 0 | | |
| #2 | 0 | | |
| #3 | 0 | | |

| ENTRY | VALID | NODE ID | CPU ID |
|---|---|---|---|
| #0 | 1 | 1 | 4 |
| #1 | 1 | 1 | 5 |
| #2 | 1 | 2 | 8 |
| #3 | 0 | | |

⋮

INFORMATION PROCESSING APPARATUS, COMPUTER-READABLE RECORDING MEDIUM, AND CONTROL METHOD

CROSS-REFERENCE TO RELATED APPLICATION

This application is based upon and claims the benefit of priority of the prior Japanese Patent Application No. 2011-290024, filed on Dec. 28, 2011, the entire contents of which are incorporated herein by reference.

FIELD

The embodiments discussed herein are related to an information processing apparatus, a control method, and a control program.

BACKGROUND

In the past, there has been known Symmetric MultiProcessor (SMP) technology, in which a plurality of arithmetic processing units share a main storage unit. As one example of an information processing system to which such SMP technology is applied, there is an information processing system in which a plurality of nodes including an arithmetic processing unit and a main storage unit are connected to the same bus, and each arithmetic processing unit shares each main storage unit through the bus.

Such an information processing system retains coherency of data cached by the arithmetic processing unit of each node by using, for example, a snoop scheme.

Also, in a system that uses a shared memory as a data communication unit between nodes, there is technology in which when an abnormality of a node is detected, data to be transmitted is converted into data representing the abnormality and the converted data is transmitted. In this technology, a node receiving the data representing the abnormality discards the received data.

Also, in a system in which a plurality of nodes are connected by a crossbar switch, there is technology in which when the retention of packet communication occurs, processing is continued by changing a communication path. In this technology, a request transmitted by a node is transmitted from the crossbar switch to its own node and other node. In this technology, the node transmitting the request measures time from the transmission of the request to reception of the request, detects a time-out, and determines that the retention of the packet communication has occurred.

Also, in a system in which a plurality of nodes are connected by a crossbar switch, there is technology in which in the case where data transmitted from a node is interrupted, when the interruption time is equal to or longer than a predetermined time, dummy data including data representing abnormality is transmitted to a node of a receiving side.

Patent Literature 1: Japanese Laid-open Patent Publication No. 2004-013723
Patent Literature 2: Japanese Laid-open Patent Publication No. 2002-366451
Patent Literature 3: Japanese Laid-open Patent Publication No. 11-168502

However, the above-described technology has a problem that does not suppress an error influence range when abnormality related to data transmission between nodes occurs.

For example, in the information processing system that retains coherency of cached data by using a snoop scheme, the following may be considered. That is, when failure occurs in a certain node (node is shut down) and communication abnormality occurs between nodes, it may be considered to bring all nodes down to retain the coherency of the cached data. In this case, an error influence range reaches all nodes.

SUMMARY

According to an aspect of an embodiment, a information processing apparatus includes a plurality of nodes each including a storage unit, and an interconnect that connects the plurality of nodes, wherein at least one node among the plurality of nodes includes an abnormality detection unit that detects abnormality in a data transmission path of data transmission using a shared memory area sharable in the one node and another node, which is included in a storage unit provided in the one node or the another node, or abnormality in a certain node included in a data transmission path of data transmission using a shared memory area sharable in the one node and the another node, which is included in a storage unit provided in the one node or the another node, an error information generation unit that generates error information, based on the abnormality detected by the abnormality detection unit, and generates an interrupt with respect to a processor within a self node, and a processor that performs recovery processing, based on the error information according to the interrupt.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram describing an example of a data format of a node map according to the first embodiment;
FIG. 6 is a diagram describing an example of a data format of a directory.

FIG. 22 is a flow chart describing shared memory detaching processing between nodes;

FIG. 23 is a flow chart describing shared memory releasing processing between nodes;

FIG. 24 is a flow chart describing a flow of processing of issuing a request;

FIG. 25 is a flow chart describing a flow of processing performed when a request is received;

FIG. 31 is a diagram illustrating an example of a data format of a handler table;

FIG. 39A is a diagram describing an example of a node map stored by a CPU of a partition #A;

FIG. 39B is a diagram describing an example of a node map representing a partition #A; and FIG. 39C is a diagram describing an example of a node map representing a partition #B.

DESCRIPTION OF EMBODIMENTS

Preferred embodiments of the present invention will be explained with reference to accompanying drawings.

[a] First Embodiment

Figure 1:
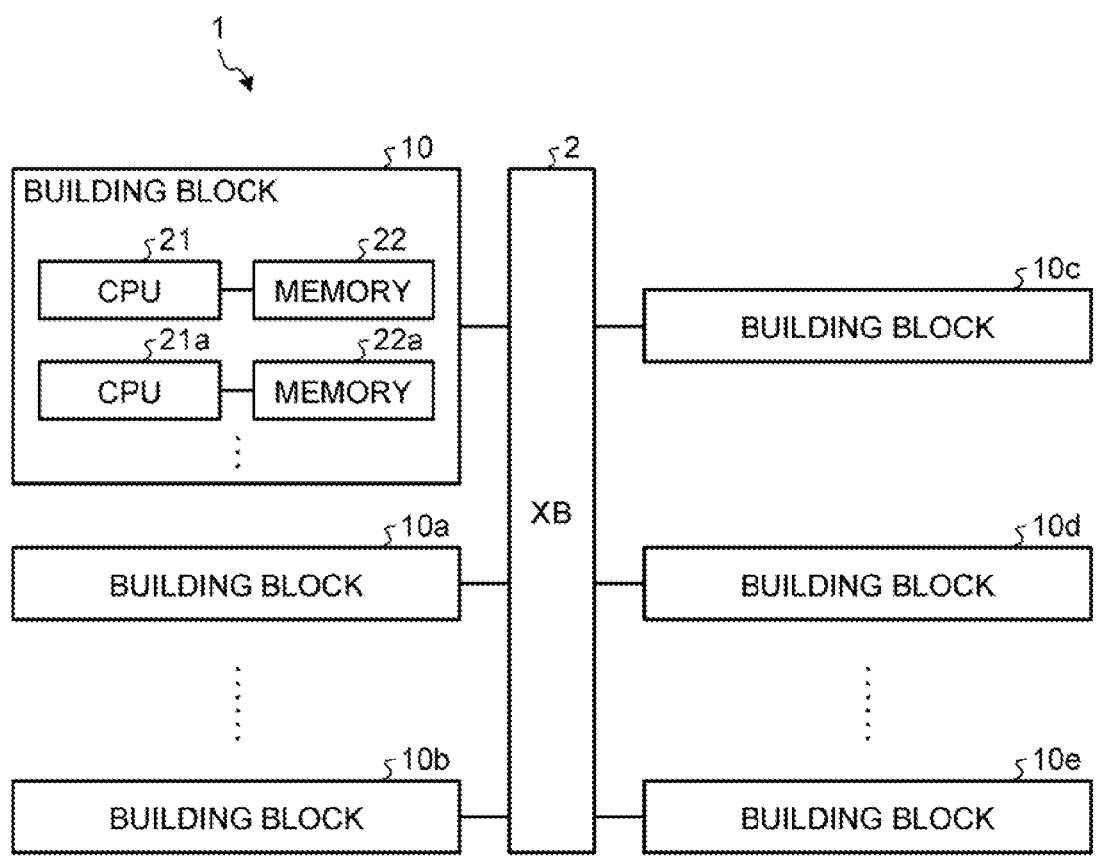
FIG. 1 is a diagram describing an example of an information processing system according to a first embodiment.

In the following first embodiment, an example of an information processing system including a plurality of nodes will be described with reference to FIG. 1. FIG. 1 is a diagram describing an example of an information processing system according to the first embodiment. In the example illustrated in FIG. 1, a information processing system 1 includes a crossbar switch (XB) 2 and a plurality of building blocks 10 to 10e. The XB 2 is a crossbar switch that mutually connects the respective building blocks 10 to 10e. Also, the XB 2 includes a service processor (not illustrated) that is a master of each service processor included in each building block 10 to 10e to be described later. Also, in the case of a small-scale configuration in which a small number of nodes are connected, the building blocks may be directly connected together, without passing through the XB 2.

Also, the building block 10 includes a plurality of central processing units (CPUs) 21 to 21c and a plurality of memories 22 to 22c. Also, the other building blocks 10a to 10e also have the same configuration as the building block 10, and a description thereof will not be provided. Also, in the example illustrated in FIG. 1, a description about the CPUs 21b and 21c and the memories 22b and 22c is not provided. Also, an input/output (I/O) device (not illustrated) is provided within each building block. In this embodiment, cache coherence control between the CPUs is realized in a directory scheme, and a home CPU to be described later, which has a memory for storing the data, manages a corresponding directory.

The respective building blocks 10 to 10e independently operate the OS. In other words, the respective CPUs 21 to 21c independently execute the OS. The OS executed by the respective building blocks 10 to 10e is operated in different partitions at every building block. The term "partition" represents a group of building blocks in which the same OS operates and which operate as a single system in view of the operating OS.

For example, the building blocks 10 to 10a operate as a partition #A, and the building blocks 10b to 10d operate as a partition #B. In this case, the OS operated by the building block 10 identifies that the building blocks 10 and 10a operate as a single system, and the OS operated by the building block 10b identifies that the building blocks 10b to 10d operate as a single system.

Figure 2:
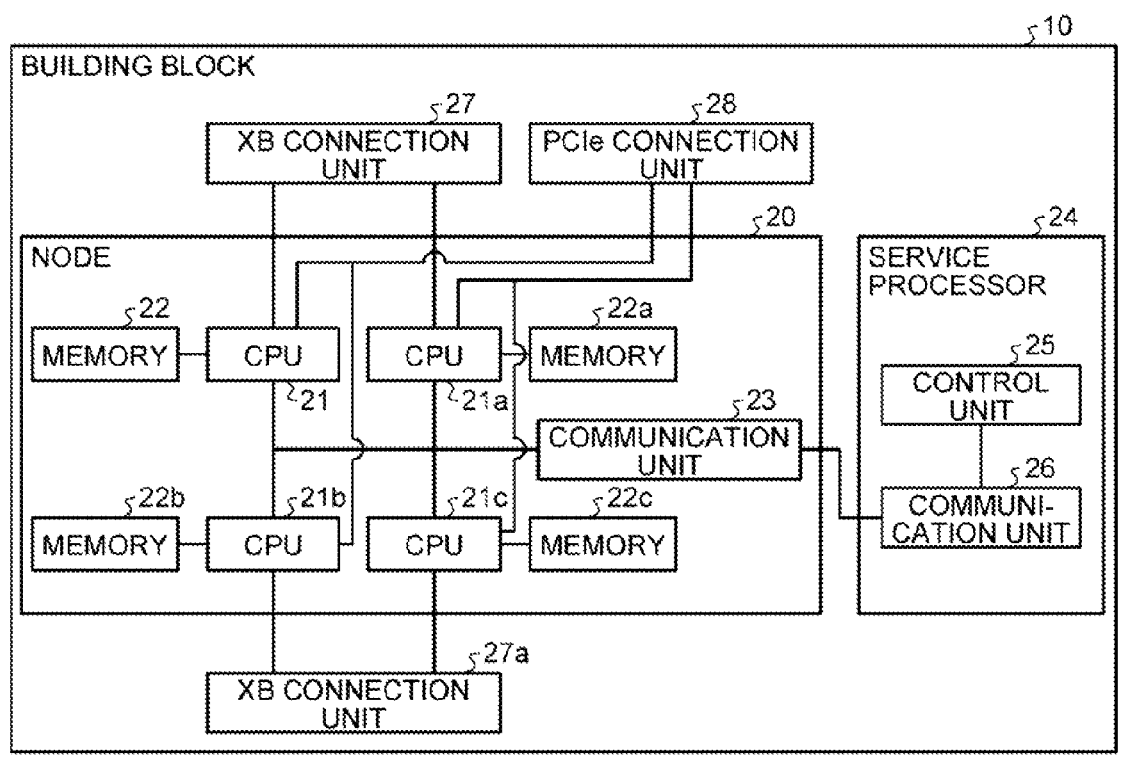
FIG. 2 is a diagram describing a functional configuration of a building block according to the first embodiment.

Next, an example of a configuration of a building block will be described with reference to FIG. 2. FIG. 2 is a diagram describing a functional configuration of a building block according to the first embodiment. In the example illustrated in FIG. 2, the building block 10 includes a node 20, a service processor 24, XB connection units 27 and 27a, and a peripheral component interconnect express (PCIe) connection unit 28.

The node 20 includes a plurality of CPUs 21 to 21c, a plurality of memories 22 to 22c, and a communication unit 23.

The service processor 24 includes a control unit 25 and a communication unit 26. Also, in the example illustrated in FIG. 2, the respective CPUs 21 to 21c are mutually connected and are connected to the communication unit 23. Also, the respective memories 22 to 22c are connected to the respective CPUs 21 to 21c. The service processor 24 is connected to a server manager terminal through a network line, such as a local area network (LAN) (not illustrated), receives an instruction from the manager terminal, and performs control such as various setting changes within the node or the building block 10.

Also, the respective CPUs 21 to 21c are connected to the XB connection unit 27 or the XB connection unit 27a. Also, the XB connection units 27 and 27a may be the same XB connection unit. Also, the respective CPUs 21 to 21c are connected to the PCIe connection unit 28. Also, the communication unit 23 is connected to the communication unit 26 included in the service processor 24. Also, the control unit 25, the communication unit 26, the communication unit 23, and the respective CPUs 21 to 21c, for example, are connected by inter-integrated circuit ($I^2C$).

The CPUs 21 to 21c are arithmetic processing units that execute an application. Also, the respective CPUs 21 to 21c are connected to the memories 22 to 22c, respectively. Also, in the case where the running application makes a request to allocate a shared memory, the respective CPUs 21 to 21c mutually perform communication and perform the allocation of the shared memory in which the application uses. Also, the respective CPUs 21 to 21c use the respective memories 22 to 22c or some of the memories included in other building blocks 10a to 10e as the shared memory.

Figure 3:
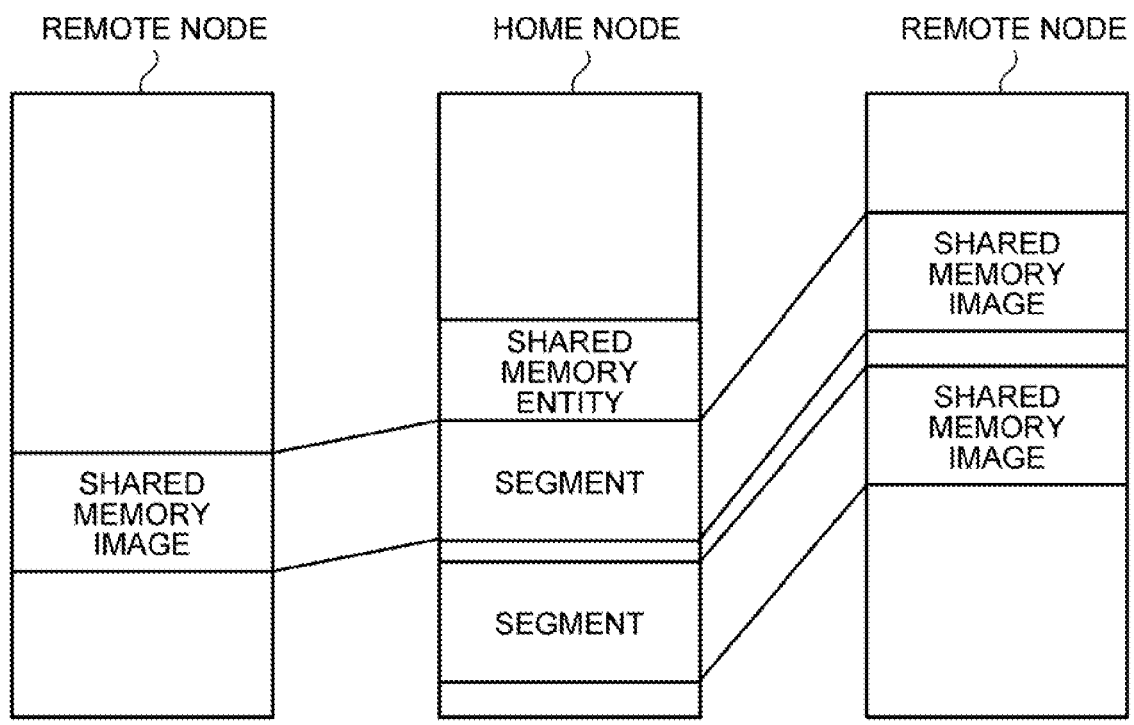
FIG. 3 is a diagram describing an example of a memory map when other node is attached to a node to which a shared memory is allocated.

FIG. 3 is a diagram describing an example of a memory map when other node is attached to a node to which a shared memory entity is allocated. In the example of FIG. 3, when the shared memory is allocated to a node owning the memory entity (this is referred to as a home node), the home node partitions the shared memory in a constant area size. The unit of partition is referred to as a segment, but the partition into segments is not essential. In the case where other node makes a request to allocate the shared memory owned by the corresponding home node, this process is called as "attach" request hereafter, the node can start using the shared memory of the corresponding home node. A memory area used by this remote node is referred to as a shared memory image area. A single remote node may be attached to the shared memory image area, and a plurality of remote nodes may be attached to the shared memory image area.

Returning to FIG. 2, the respective CPUs 21 to 21c have a node map that matches a physical address with a CPUID (identification) that is an identifier of a CPU connected to a memory to which the physical address is allocated. Also, the CPUID is uniquely determined in the system 1, and is not overlapped.

The respective CPUs 21 to 21c perform communication with other CPUs by using the node map. For example, in the case where the CPUID matched with the physical address being the access target represents a CPU different from the CPUs 21 to 21c, the CPU 21 transmits a memory access request to other node through the XB connection unit 27 or the XB connection unit 27a and the XB 2. Also, in the case where the CPU 21 receives a request for a memory connected with itself from other node, the CPU 21 reads requested target data from the memory 22 connected with itself, and transmits the read data to a request source. The other CPUs 21a to 21c perform the same processing.

Also, the respective CPUs 21 to 21c have a function that performs an address translation by using a translation lookaside buffer (TLB) and performs the same processing as the conventional CPU, such as trap processing, when a TLB miss occurs.

Also, the respective CPUs 21 to 21c detect the abnormality (error) of data transmission between the nodes. An example of a method for detecting the abnormality of data transmission between the nodes will be described. For example, the respective CPUs 21 to 21c measure a time after the transmission of the request. Then, before receiving a response after the transmission of the request, the time is out if a time after the transmission of the request exceeds a predetermined time. Therefore, the respective CPUs 21 to 21c detect the abnormality of data transmission between the nodes. Also, the respective CPUs 21 to 21c also detect the abnormality when a negative response is received from other node with respect to the request.

When the abnormality is detected, the respective CPUs 21 to 21c perform a variety of processing. For example, in the case where dirty cache data written back to the shared memory of the respective memories 22 to 22c is not written back by a node causing the occurrence of the abnormality (for example, node crash), the respective CPUs 21 to 21c perform the following processing. In other words, to the directory representing the status of the cache, the respective CPUs 21 to 21c write a special value representing the abnormality that dirty cache data to be written back to the shared memory of the respective memories 22 to 22c by the crashed node is not written back. In addition, in the case where the abnormality is detected and dirty cache data written back to the shared memory of the respective memories 22 to 22c is not written back by a node causing the occurrence of the abnormality, the respective CPUs 21 to 21c may perform the following processing. In other words, to the area of the shared memory of the respective memories 22 to 22c in which cache data is written back by the crashed node, the respective CPUs 21 to 21c may write special data representing an error state. By such processing, it is enabled to represent that data of the shared memory that is not written back is not normal.

Also, in the case where a write back request does not reach a home CPU, which is to be described later, a local CPU, which is to be described later, recognizes a transaction failure by detecting a time-out, which is to be described later, from the home CPU. In this case, the local CPU discards the corresponding data. The directory managed by the home CPU is in a state that the local CPU owns data in its cache. Therefore, a "MoveOut" request is generated from the home CPU. The "MoveOut" request causes a cache miss to occur in the local CPU. However, an error response is returned with respect to the "MoveOut" request, and a state of a directory existing in the home CPU is abnormally updated, that is, data representing the above-described error state is written.

Also, in the case where the physical address (PA) of the shared memory of the crashed node is written in an error occurrence address register, a trap (interrupt) occurs. In other words, in the case where the physical address is written in the error occurrence address register, the respective CPUs 21 to 21c perform the trap processing. In the trap processing, for example, a signal is transmitted to a signal handler.

Herein, the signal handler is started when receiving a signal. In the processing by the signal handler, a variety of processing is performed. For example, in the processing by the signal handler, in the case where the "shared memory entity" exists in the crashed node, the "shared memory image" is detached. In other words, the shared memory included in the crashed node is deallocated. Also, in the processing by the signal handler, processing of recovering the shared memory of the memory of the node detecting the crash of other node is performed. As one example of the recovery processing, there may be processing of clearing the value, which represents the abnormality that the cache data written back to the shared memory is not written back, from the directory. Also, as another example of the recovery processing, there may be processing of clearing data, which represents the error state, from the shared memory.

The memories 22 to 22c are memories that are shared by all CPUs included in the information processing system 1. Also, in the information processing system 1, with respect to the memories included in all the building blocks 10 to 10e, the service processors of the respective building blocks 10 to 10e allocate physical addresses mapped to the same physical address space. In other words, physical addresses having non-overlapped values are allocated to at least the memories used as the shared memory among all the memories included in the information processing system 1.

Also, the memories 22 to 22c set a part of the storage area as a shared area shared by all the CPUs included in the information processing system 1, and set the other part as a local area storing kernel data or user data by the CPUs 21 to 21c accessed to themselves, and an I/O area used by an I/O device having no relation to exchange with other node through the shared memory.

The control unit 25 performs control of the building block 10. For example, the control unit 25 performs a power management of the building block 10, a monitoring or control of abnormality within the building block 10, or the like. Also, the control unit 25 is connected to the service processors included in other building blocks 10a to 10e by a network (not illustrated), and performs an associated control between the respective building blocks 10a to 10e. Also, the control unit 25 may perform communication with the OS executed by the respective CPUs 21 to 21c.

Also, the control unit 25 accesses the respective CPUs 21 to 21c through the communication unit 26 and the communication unit 23. The control unit 25 performs controlling CPUs in the building block by updating the like of node maps included in the respective building blocks 10 to 10e.

Also, the communication unit 23 transmits a control signal from the control unit 25 to the respective CPUs 21 to 21c through the communication unit 26 included in the service processor 24. Also, the communication unit 26 transmits a control signal from the control unit 25 to the communication unit 23 included in the node 20. Also, the XB connection units 27 and 27a connect the respective CPUs 21 to 21c to the XB 2, and relays communication between the CPUs included in the respective building blocks 10 to 10e. Also, the PCIe connection unit 28 relays access to the I/O device by the respective CPUs 21 to 21c.

Figure 4:
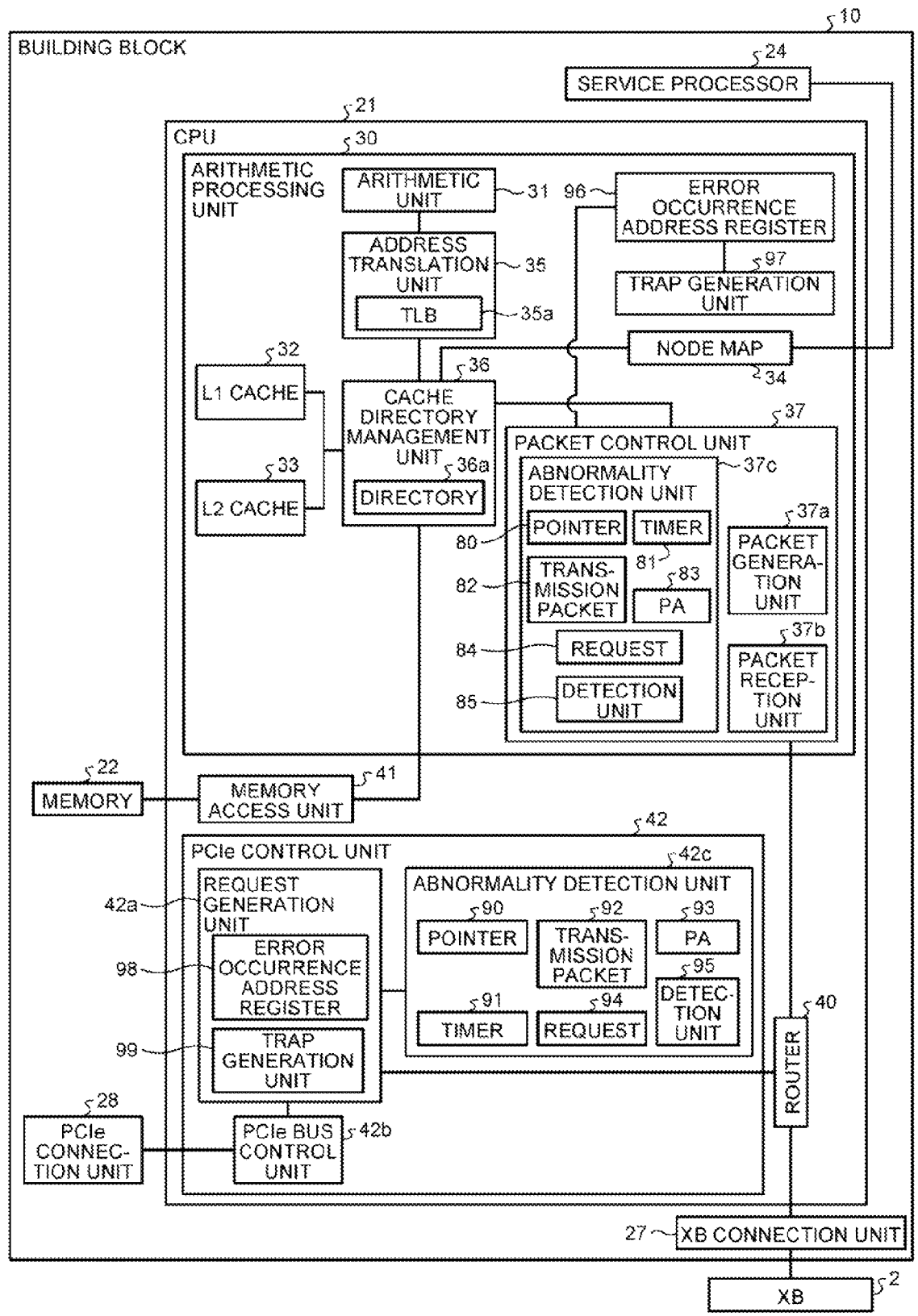
FIG. 4 is a diagram describing a functional configuration of a CPU according to the first embodiment.

Next, the functional configuration of the respective CPUs 21 to 21c will be described with reference to FIG. 4. FIG. 4 is a diagram describing the functional configuration of the CPU according to the first embodiment. Also, since the CPUs 21a to 21c have the same function as the CPU 21, a description thereof will not be provided. Also, in the example illustrated in FIG. 4, a description about the communication units 23 and 26 connecting the service processor 24 to the CPU 21 is not provided.

In the example illustrated in FIG. 4, the CPU 21 includes an arithmetic processing unit 30, a router 40, a memory access unit 41, and a PCIe control unit 42. Also, the arithmetic processing unit 30 includes an arithmetic unit 31, a level 1 (L1) cache 32, a level 2 (L2) cache 33, a node map 34, an address translation unit 35, a cache directory management unit 36, a packet control unit 37, an error occurrence address register 96, and a trap generation unit 97. Also, the respective units, such as the router 40, the memory access unit 41, and the PCIe control unit 42, are not necessary to be included inside the same CPU 21.

Also, the packet control unit 37 includes a packet generation unit 37a, a packet reception unit 37b, and an abnormality detection unit 37c. Also, the PCIe control unit 42 includes a request generation unit 42a, a PCIe bus control unit 42b, and an abnormality detection unit 42c.

First, the node map 34 included in the arithmetic processing unit 30 will be described. The node map 34 is a table in which a physical address and a CPUID of a CPU connected to a memory having a storage area indicated by the physical address are registered in association with each other. Hereinafter, an example of information registered in the node map 34 will be described with reference to the drawing.

FIG. 5 is a diagram describing an example of a data format of a node map according to the first embodiment. In the example illustrated in FIG. 5, the node map 34 has entries matched with the registration contents of the respective items "address", "valid", "node ID", and "CPUID". Herein, the "address" item of each entry stores information representing an address area including a plurality of consecutive physical addresses.

For example, the information processing system 1 partitions the physical address space, which is allocated to all memories, into address areas of an equal size, and assigns identifiers, such as #0, #1, and #2, to the respective address areas. The information processing system 1 registers the identifiers, which represent the respective address areas, in "address" of each entry included in the node map 34. The example of FIG. 5 illustrates the case where the identifier #0 is registered in the "address" item of the first entry. Also, the example of FIG. 5 illustrates the case where the identifier #1 is registered in the "address" item of the second entry. Also, the example of FIG. 5 illustrates the case where the identifier #2 is registered in the "address" item of the third entry.

Also, in the "valid" item of each entry, a valid bit representing whether an access to a storage area indicated by the physical address is enabled is registered. For example, in the case where the storage area indicated by the physical address is the shared area shared by the respective CPUs, the valid bit (for example, "1") representing that the access is enabled is registered. The example of FIG. 5 illustrates the case where the valid bit of "1" is registered in the "valid" item of the first entry. Also, the example of FIG. 5 illustrates the case where the valid bit of "1" is registered in the "valid" item of the second entry. Also, the example of FIG. 5 illustrates the case where the valid bit of "0" is registered in the "valid" item of the third entry, which represents that the access to the storage area indicated by the physical address is disabled.

Also, in the item "node ID" of each entry, an identifier representing a node in which a memory allocated with the physical address exists is registered. The example of FIG. 5 illustrates the case where the identifier of "1" representing the node is registered in the "node ID" item of the first entry. Also, the example of FIG. 5 illustrates the case where the identifier of "1" representing the node is registered in the "node ID" item of the second entry.

Also, in the item "CPUID" of each entry, an identifier representing a CPU connected to a memory allocated with a physical address is registered. In other words, the node map 34 represents that which CPU is connected to the memory of the physical address as the access target. The example of FIG. 5 illustrates the case where the identifier of "4" representing the CPU is registered in the "CPUID" item of the first entry. Also, the example of FIG. 5 illustrates the case where the identifier of "5" representing the CPU is registered in the "CPUID" item of the second entry.

Also, when it is possible to represent that which CPU is connected to the physical address as the access target, information may be registered in the node map 34 in arbitrary formats other than this embodiment.

Returning to FIG. 4, the arithmetic unit 31 is a core of an arithmetic unit that executes arithmetic processing and executes an operating system (OS) or an application. Also, when executing a data read or write, the arithmetic unit 31 outputs a logical address (virtual address: VA) of a storage area, in which data being the read target or the write target is stored, to the address translation unit 35.

The L1 cache 32 is a cache memory that temporarily stores data frequently used in the arithmetic unit 31. As in the case of the L1 cache 32, the L2 cache 33 temporarily stores data frequently used. However, the L2 cache 33 is a low-speed cache memory, whose storage capacity is smaller than the L1 cache 32 and whose data read and write speed are low. Herein, the directory information is stored in the cache directory management unit 36 and is information representing a CPU caching data stored in each storage area of the memory 22 or an update state of the cached data. Also, in the following description, the "directory information" is also simply referred to as a "directory". A method for managing the cache memory by the directory is technology frequently used in a Cache Coherent Non-Uniform Memory (ccNUMA) system. However, since both the ccNUMA technology and the directory technology are known technologies, a detailed description thereof will not be provided herein. Also, in FIG. 4, a directory 36a is embedded in the cache directory management unit 36, but the directory information may also be recorded in a part of the storage area of the memory 22.

The address translation unit 35 includes a TLB 35a. In the TLB 35a, an entry in which a logical address and a physical address are matched with each other is registered. The address translation unit 35 translates the logical address output by the arithmetic unit 31 into the physical address by using the TLB 35a. For example, the address translation unit 35 searches the physical address, which corresponds to the logical address obtained from the arithmetic unit 31, from the TLB 35a. As the search result, when the physical address is obtained, the address translation unit 35 outputs the obtained physical address to the cache directory management unit 36. Also, when a TLB miss occurs, the address translation unit 35 performs the trap processing. Herein, system software, such as the OS, registers a set of the physical address and the logical address, where the TLB miss occurs, in the TLB 35a. However, regarding the physical address where the registration of this set is inhibited, even when the TLB miss occurs, the set of the physical address and the logical address is not registered in the TLB 35a by the system software, such as the OS.

Herein, the OS, the address translation unit 35, or the like, performs the following processing when receiving a request to allocate the shared memory from the application executed by the arithmetic unit 31. In other words, when the TLB miss occurs, the system software, such as the OS, registers the entry in the TLB 35a. Also, in the case where the TLB miss does not occur, since the registration of the entry in the TLB 35a is already completed, the address translation unit 35 performs a conversion from the logical address to the physical address.

Also, when receiving a request to allocate the logical area from the application or the OS, the address translation unit 35 performs the following processing. In other words, when the TLB miss occurs, the system software, such as the OS, registers the entry, in which the logical address for accessing the local area dedicated to the CPU 21 and the physical address of a range allocated to the local area are matched with each other, in the TLB 35a.

Also, the OS or the like deletes the entry, which includes the physical address of the shared memory of the node where the abnormality occurs, from the TLB 35a.

The cache directory management unit 36 includes the directory 36a. The cache directory management unit 36 performs the management of the cache data and the directory. The cache directory management unit 36 obtains the physical address, which is generated by converting the logical address output by the arithmetic unit 31, from the address translation unit 35.

The cache directory management unit 36 performs the following processing when obtaining the physical address from the address translation unit 35. In other words, by using the directory 36a, the cache directory management unit 36 determines whether the data stored in the obtained physical address is cached in the L1 cache 32 and the L2 cache 33.

The cache directory management unit 36 outputs the cached data to the arithmetic unit 31 when it is determined that the data stored in the obtained physical address is cached. Also, the cache directory management unit 36 performs the following processing when the data stored in the obtained physical address is not cached in the L1 cache 32 and the L2 cache 33. First, the cache directory management unit 36 identifies the entry of the range including the obtained physical address with reference to the node map 34. The cache directory management unit 36 determines whether the CPUID of the identified entry is the CPUID of the CPU 21. Then, the cache directory management unit 36 outputs the physical address to the memory access unit 41 when the CPUID of the identified entry is the CPUID of the CPU 21.

Also, the cache directory management unit 36 performs the following processing when the CPUID of the identified entry is not the CPUID of the CPU 21. In other words, the cache directory management unit 36 obtains the CPUID and the node ID of the identified entry. The cache directory management unit 36 outputs the obtained CPUID and physical address to the packet control unit 37.

Also, the cache directory management unit 36 stores the obtained data in the L1 cache 32 and the L2 cache 33 when the data stored in the storage area indicated by the output physical address is obtained from the memory access unit 41 or the packet control unit 37. The cache directory management unit 36 outputs the data cached in the L1 cache 32 to the arithmetic unit 31.

Also, the cache directory management unit 36 performs the following processing when obtaining the physical address from the packet control unit 37, that is, when obtaining the physical address being the target of the request of the memory access from other CPU or I/O device. In other words, the cache directory management unit 36 determines whether the obtained physical address is the physical address allocated to the local area with reference to the node map 34.

When the obtained physical address is the physical address allocated to the local area, the cache directory management unit 36 instructs the packet control unit 37 to transmit a negative response (access error) to a request source.

Also, when the obtained physical address is the physical address allocated to the shared area, the cache directory management unit 36 instructs to obtain the data stored in the storage area indicated by the obtained physical address, output the obtained data to the packet control unit 37, and transmit the obtained data to the request source.

Also, the cache directory management unit 36 also performs processing of retaining the coherency of the cached data by using the directory scheme. For example, when transmitting the data stored in the memory 22 to the CPU of the request transmission source, the cache directory management unit 36 determines whether a CPU other than the CPU of the request transmission source caches the corresponding data.

When other CPU does not cache the data being the request target, the cache directory management unit 36 obtains the data being the request target from the L1 cache 32, the L2 cache 33, and the memory 22. Then, the cache directory management unit 36 outputs the obtained data to the packet control unit 37.

On the other hand, when other CPU caches the data being the request target, the cache directory management unit 36 performs processing of retaining the cache coherence by using an Illinois protocol or the like. For example, the cache directory management unit 36 determines in which one of Modified/Exclusive/Shared/Invalid (MESI) the state of the cached data is.

The cache directory management unit 36 performs a transmission and reception of a request or an order (instruction) for retaining the coherency with the cache directory management unit included in other CPU, according to the determination result, and performs processing according to the state of the cached data. Herein, "Modified" represents that any, and only, one CPU caches data and the cached data is in an updated state. Also, when the state of the cached data is "Modified", a write back is performed.

Also, "Exclusive" represents that any, and only, one CPU caches data and the cached data is in a non-updated state. Also, "Shared" represents that a plurality of CPUs cache data and the cached data is in a non-updated state. Also, "Invalid" represents that the status of the cache is not registered.

As a specific example, the cache directory management unit 36 instructs the packet generation unit 37a to transmit an order to instruct the write back to the CPU caching the data of the M (Modified) status. The cache directory management unit 36 updates the status of the data and performs processing according to the status after the update. Also, the types of requests or orders transmitted and received by the cache directory management unit 36 will be described later.

Also, in the case where the abnormality of data transmission between the nodes is detected, the cache directory management unit 36 performs the following processing when cache data written back to the shared memory of the memory 22 is not written back by the node causing the occurrence of the abnormality. In other words, the cache directory management unit 36 records a value, which represents the abnormality that cache data written back to the shared memory of the memory 22 is not written back by the crashed node, in a predetermined area of the directory 36a.

FIG. 6 is a diagram describing an example of a data format of a directory. As illustrated in FIG. 6, the directory 36a includes a "UE" item of 4 bits from a zeroth bit to a third bit. Also, the directory 36a includes a "PRC" item of 63 bits from a fourth bit to a sixty-sixth bit. Also, the directory 36a includes a "CKBIT" item of 2 bits from a sixty-seventh bit to a sixty-eighth bit. In the "CKBIT" item, data obtained by coding the status of the cache is registered. In the "PRC" item, data in which the position of the CPU retaining the cache is represented by a bit map is registered. In the "UE" item, data representing the abnormality of the directory and the cause of the abnormality is registered.

Herein, the case where the cache directory management unit 36 includes the directory 36a illustrated in the example of FIG. 6 will be described. In this case, when the abnormality is detected and the cache data written back to the shared memory of the memory 22 is not written back by the node causing the occurrence of the abnormality, the cache directory management unit 36 performs the following processing. That is, the cache directory management unit 36 records a value of 4 bits or less, which represents the abnormality that cache data written back to the shared memory of the memory 22 is not written back by the crashed node, and represents the cause, in the "UE" item of the directory 36a. In this way, it is enabled to represent that data of the shared memory that is not written back is not normal.

Also, the cache directory management unit 36 may perform the following processing when the abnormality of data transmission between the nodes is detected, and cache data written back to the shared memory of the memory 22 is not written back by the node causing the occurrence of the abnormality. In other words, the cache directory management unit 36 may record data, which represents an error state, in the area of the shared memory of the memory 22 in which cache data is written back by the crashed node. Herein, an example of data representing the error state being recorded in the area of the shared memory will be described. For example, in the case where Error Check and Correct (ECC) data is included in the data stored in the memory 22 at every predetermined bit number, an error correction of 2 bits or more may be performed according to an ECC generating polynomial. In this case, a syndrome of a specific value representing an error of n (n≥2) bits or more having a low probability of error occurrence as compared to other errors may be data representing the error state being recorded in the area of the shared memory. Also, when recorded in a data body, a value at which the syndrome has a specific value may be data representing the error state being recorded in the area of the shared memory. In this way, it is enabled to represent that data of the shared memory that is not written back is not normal.

Also, the cache directory management unit 36 performs recovery processing on the shared memory of the memory 22. As one example of the recovery processing, there may be processing of clearing the value, which represents the abnormality that the cache data written back to the shared memory is not written back, from the directory 36a. Also, as another example of the recovery processing, there may be processing of clearing data, which represents the error state, from the shared memory. As will be described later, the recovery processing is performed by the instruction of the OS or the application software.

When the packet generation unit 37a obtains the physical address and the CPUID from the cache directory management unit 36, the packet generation unit 37a generates the packet storing the obtained physical address and the CPUID, that is, the packet being the request of the memory access. The packet generation unit 37a transmits the generated packet to the router 40.

Figure 7:
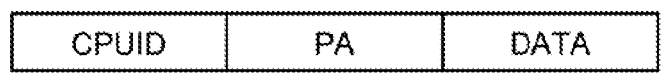
FIG. 7 is a diagram describing a packet transmitted by a CPU according to the first embodiment.

FIG. 7 is a diagram describing a packet transmitted by a CPU according to the first embodiment. In the example illustrated in FIG. 7, the packet generation unit 37a generates a request including the CPUID, the physical address, and the data representing the contents of the request, and outputs the generated request to the router 40. In this case, the router 40 outputs the request generated by the packet generation unit 37a to the XB 2 through the XB connection unit 27. The XB 2 transmits the request to the CPU indicated by the CPUID included in the request.

Also, when the packet generation unit 37a receives the instruction to issue the request or the order for retaining the coherency from the cache directory management unit 36, the packet generation unit 37a generates the instructed request or order. The packet generation unit 37a transmits the generated request or order to the designated CPU through the router 40, the XB connection unit 27, and the XB 2. Also, when the packet generation unit 37a obtains data from the I/O device, the packet generation unit 37a outputs the request of access to the I/O to the router 40.

Also, when the packet generation unit 37a transmits the request, the packet generation unit 37a outputs data indicating the transmission of the request to the abnormality detection unit 37c. This data includes information on the request, such as the type of transmitted request, or the physical address of the memory being the access target.

When the packet reception unit 37b receives the packet output by other CPU or other I/O, except for its own node, through the XB 2, the XB connection unit 27, and the router 40, the packet reception unit 37b obtains a physical address included in the received packet. The packet reception unit 37b outputs the obtained physical address to the cache directory management unit 36. Also, when the packet reception unit 37b receives data transmitted by other CPU, the packet reception unit 37b outputs the received data to the cache directory management unit 36.

Also, when the packet reception unit 37b receives the request or order for retaining the coherency, the packet reception unit 37b outputs the received request or order to the cache directory management unit 36. Also, when the packet reception unit 37b receives a response to access request or data with respect to the I/O device from the router 40, the packet reception unit 37b outputs the received response or data to the cache directory management unit 36. In this case, the cache directory management unit 36, for example, performs processing of outputting the obtained data to the memory access unit 41 and storing the obtained data in the memory 22.

Also, when the packet reception unit 37b receives a response to the request transmitted by the packet generation unit 37a, the packet reception unit 37b outputs data indicating the reception of the response to the abnormality detection unit 37c. This data includes information on the response, such as the type of received response.

The abnormality detection unit 37c includes a pointer 80, a timer 81, a transmission packet 82, a PA 83, a request 84, and a detection unit 85.

The abnormality detection unit 37c starts up the timer 81 for counting the time, whenever the abnormality detection unit 37c receives data indicating the transmission of the request from the packet generation unit 37a. Also, the abnormality detection unit 37c starts up the timer 81 whenever the abnormality detection unit 37c receives data indicating the reception of the response from the packet reception unit 37b. Also, when the abnormality detection unit 37c receives data indicating the transmission of the request from the packet generation unit 37a, from the received data, the abnormality detection unit 37c stores the physical address of the memory of the access target, which is included in the transmitted request, in the PA 83. Also, when the abnormality detection unit 37c receives data indicating the transmission of the request from the packet generation unit 37a, from the received data, the abnormality detection unit 37c stores the transmitted request in the request 84.

Also, when the abnormality detection unit 37c receives data indicating the transmission of the request from the packet generation unit 37a, from the received data, the abnormality detection unit 37c registers the identifier of the transmitted request in the transmission packet 82.

Figure 8:
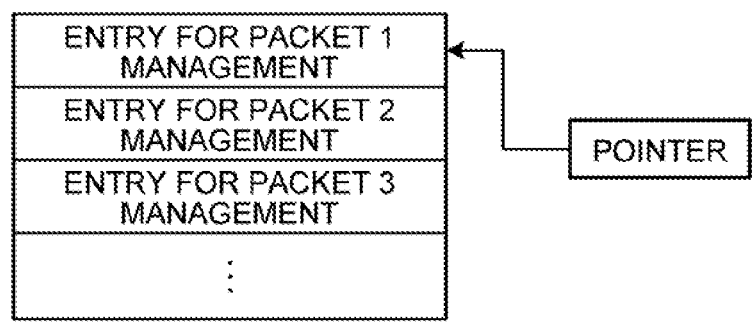
FIG. 8 is a diagram illustrating an example of a transmission packet.

Also, when the abnormality detection unit 37c receives data indicating the reception of the response from the packet reception unit 37b, from the received data, the abnormality detection unit 37c deletes the physical address of the memory of the access target, which is included in the request corresponding to the received response, from the PA 83. Also, when the abnormality detection unit 37c receives data indicating the reception of the response from the packet reception unit 37b, from the received data, the abnormality detection unit 37c deletes the request corresponding to the received response from the request 84. Also, when the abnormality detection unit 37c receives data indicating the reception of the response from the packet reception unit 37b, from the received data, the abnormality detection unit 37c deletes the identifier of the request corresponding to the received response from the transmission packet 82. FIG. 8 is a diagram illustrating an example of a transmission packet. For example, in the transmission packet 82 illustrated in FIG. 8, in the case where the number of requests whose response is not returned back is N, identifiers of the N requests are registered in the respective entries, from an entry for packet 1 management to an entry for packet N management, respectively.

Also, the pointer 80 indicates the request having the oldest transmission time among the respective requests represented by the respective identifiers registered in the transmission packet 82. For example, in the example of FIG. 8, the pointer 80 indicates the request represented by the identifier registered in the entry for packet 1 management.

The detection unit 85 determines whether the time of the timer 81 has passed by a predetermined time. In the case where the predetermined time has elapsed, the response corresponding to the request indicated by the pointer 80 is not received within the predetermined time. Therefore, the detection unit 85 detects that the abnormality of data transmission occurs between the node 20 and the node including the memory of the access target. The detection unit 85 obtains a physical address of the memory of the access target, which is included in the request indicated by the pointer 80, from the PA 83, and records the obtained physical address in the error occurrence address register 96.

The trap generation unit 97 generates a trap when the physical address is recorded in the error occurrence address register 96. Also, in the case where the request/order is a "store of data to a memory" or a "write back of a cache replace", only the record of data representing the above-described abnormality may be performed, without generating the trap, and the abnormality may be detected upon load of data to the CPU. Herein, the "record of data representing the abnormality" described above represents recording a value of 4 bits or less representing the abnormality and the cause in the "UE" item of the directory 36a, or recording data representing the error state in the area of the shared memory of the memory 22.

As such, in the abnormality detection unit 37c, the time is counted by a single timer. Hence, as compared to the case where the timer is provided at every request, in the case where the number of requests whose response is not returned back is plural, the time may be counted by a smaller number of timers.

Also, the configuration of the abnormality detection unit 37c is not limited to the above-described configuration. For example, in addition to the identifier of the request, transmission time interval of the request may be registered in the transmission packet 82 of the abnormality detection unit 37c, and the timer 81 may add the interval to perform rebooting.

Figure 9:
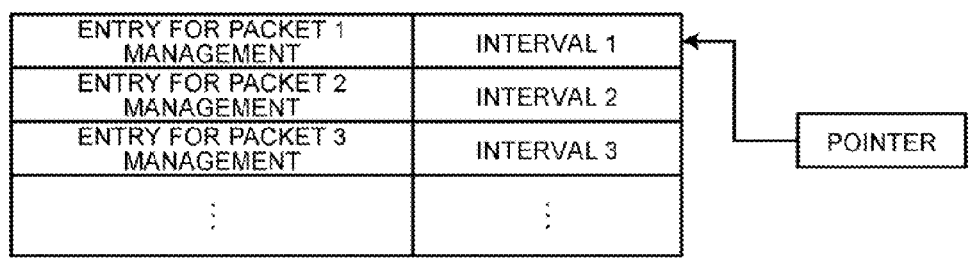
FIG. 9 is a diagram illustrating an example of another configuration of an abnormality detection unit.

FIG. 9 is a diagram illustrating an example of another configuration of the abnormality detection unit. In the example of FIG. 9, in addition to the above-described entry for packet K management (K is a natural number), a time until another request is transmitted after a certain request is transmitted is registered in the transmission packet 82. Herein, a description will be made about the case where a request 2 is transmitted after 100 ns from a transmission of a request 1, and a request 3 is transmitted after 300 ns from the transmission of the request 1. In this case, the respective identifiers of the requests 1 to 3 are registered in the entry for packet 1 management to the entry for packet 3 management. At this time, with reference to the request 1, 0 ns, 100 ns, and 300 ns are registered in an interval 1, an interval 2, and an interval 3, respectively. Herein, since the packet reception unit 37b receives the response to the request 1, the request indicated by the pointer 80 is switched from the request 1 to the request 2. At this time, although the timer 81 is rebooted, the initial value of the time is not 0 ns, and the timer 81 starts the time count from the interval of 100 ns corresponding to the request 2. Also, when the request indicated by the pointer 80 is switched from the request 2 to the request 3, in the same manner, the timer 81 starts the time count from the interval of 300 ns corresponding to the request 3. Also, when receiving a response to all sent requests, an interval of a request to be sent next time is again 0 ns.

As described above, in another example of the abnormality detection unit 37c, the time is counted by the single timer 81. Therefore, the time may be counted with high accuracy by a smaller number of timers. Also, in another example of the abnormality detection unit 37c, since the timer 81 counts the time in consideration of the interval at every request, the time may be counted with higher accuracy.

Also, in the abnormality detection unit 37c, the pointer 80 is not provided, and the timer is provided at every request. Each timer may count the time after the transmission of the request.

When the router 40 receives the packet output by the packet generation unit 37a included in the packet control unit 37, the router 40 outputs the received request to the XB connection unit 27. Also, the router 40 outputs the packet or data, which is transmitted by other CPU, to the packet reception unit 37b through the XB connection unit 27. Also, the router 40 outputs the packet, which the packet control unit 37 outputs with respect to the I/O device or the like, to the PCIe control unit 42. Also, when the router 40 receives the request of the I/O device or the like from the PCIe control unit 42, the router 40 outputs the received request or the like to the packet control unit 37. Also, when the router 40 receives the request of the I/O device from the PCIe control unit 42, the router 40 outputs the received request to the XB connection unit 27. Also, when the router 40 receives the response to the I/O device through the XB connection unit 27, the router 40 outputs the received response to the PCIe bus control unit 42b.

The memory access unit 41 is a so-called memory access controller (MAC) and performs control of access to the memory 22. For example, when the memory access unit 41 receives a physical address from the cache directory management unit 36, the memory access unit 41 obtains data stored in the area of the memory 22 indicated by the received physical address, and outputs the obtained data to the cache directory management unit 36. Also, the memory access unit 41 makes the shared area redundant by using a memory mirror function.

When the request generation unit 42a obtains an access request to the I/O device through the router 40, the request generation unit 42a generates a request to be transmitted to the I/O device being the target of the access request, and outputs the generated request to the PCIe bus control unit 42b. Also, when the request generation unit 42a obtains the physical address and the CPUID from the I/O device, the request generation unit 42a generates a packet storing the obtained physical address and CPUID, that is, a packet being a request of memory access. As the type of request, there is a request for the I/O device to read a memory connected to other CPU.

Also, when the request generation unit 42a obtains the physical address, the CPUID, and the recorded data from the I/O device, the request generation unit 42a generates a packet storing the obtained physical address, CPUID, and recorded data, that is, a packet being a request of memory access. As the type of request, there is a request for the I/O device to write data to a memory connected to other CPU. Then, the request generation unit 42a transmits the generated packet to the router 40.

Also, the request generation unit 42a includes an error occurrence address register 98 and a trap generation unit 99.

When the PCIe bus control unit 42b obtains the request generated by the request generation unit 42a, the PCIe bus control unit 42b transmits the request to the I/O device through the PCIe connection unit 28. Also, when the PCIe bus control unit 42b obtains the physical address and the CPUID from the I/O device through the PCIe connection unit 28, the PCIe bus control unit 42b transmits the obtained physical address and CPUID to the request generation unit 42a. Also, when the PCIe bus control unit 42b obtains the physical address, the CPUID, and the recorded data from the I/O device through the PCIe connection unit 28, the PCIe bus control unit 42b transmits the obtained physical address, CPUID, recorded data to the request generation unit 42a.

Also, since the response to the request for the I/O device to read the memory connected to other CPU is not received within a predetermined time after the request is transmitted, the PCIe bus control unit 42b performs the following processing when the abnormality is detected. That is, the PCIe bus control unit 42b transmits a "poisoned TLP" packet to the PCIe connection unit 28. In this case, when the PCIe connection unit 28 receives the "poisoned TLP" packet, the PCIe connection unit 28 transmits the received "poisoned TLP" packet to the I/O device. Therefore, the I/O device may detect that abnormality occurs. Also, when it is detected that the abnormality occurs, since the PCIe connection unit 28 notifies that abnormality occurs in a device driver software, the recovery processing is performed. As an example of the recovery processing, in the case where abnormality occurs in a LAN, transmission/reception data being processed is discarded once, the status of the LAN chip is initialized, and after the initialization, data transmission/reception is performed as usual.

Figure 10:
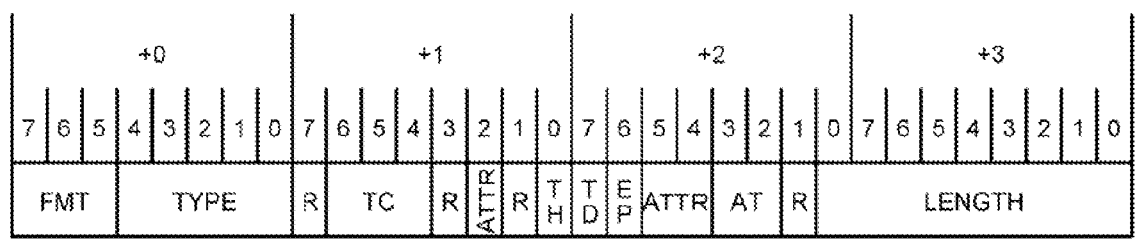
FIG. 10 is a diagram illustrating an example of a data format of "TLP header"

"poisoned TLP" will be described with reference to FIG. 10. FIG. 10 is a diagram illustrating an example of a data format of "TLP header". "poisoned TLP" is a packet defined by a "PCI express" specification. When an EP bit of the "TLP header" illustrated in the example of FIG. 10 is on, it is recognized as "poisoned TLP".

Figure 11:
FIG. 11 is a diagram describing a specific example of an operation of a PCIe control unit that receives a "poisoned TLP" packet.

FIG. 11 is a diagram describing a specific example of an operation of a PCIe control unit that receives a "poisoned TLP" packet. The example of FIG. 11 illustrates the hierarchical structure of the device driver in the case where the PCIe control unit 42 corresponds to "Root Complex", and the PCIe connection unit 28 corresponds to "PCI express" card. This example illustrates the case where the "PCI express" card of SAS is mounted as the "PCI express" card. The detection of the event such as the generation of the "poisoned TLP" on the "PCI express" bus, or the handling on the bus is common, regardless of the type of "PCI express" card. Therefore, the detection of the event or the handling on the bus is not performed by an individual device driver, such as an SAS device driver, but is performed by a "Root Complex" driver.

On the other hand, when a certain event on the bus, for example, an error-related event occurs, a recovery processing unique to the SAS device driver is often performed in the SAS device driver side being operated on the bus where the error occurs. Herein, as an example of the recovery processing unique to the SAS device driver, there may be termination processing or a retry of transmission processing being processed. When the "poisoned TLP" occurs, the "Root Complex" driver performs a reaping of an error phenomenon (read of detailed information, clear of status bits, or the like), and then, notifies the occurrence of error to the SAS device driver on the bus. By this notification, the SAS device driver starts the recovery processing unique to the SAS device driver. Also, instead of notifying the occurrence of error to the SAS device driver, the occurrence of error may be notified to an application process using the I/O device, and the rebooting processing of the I/O device from the application process may be performed.

Also, since the response to the request for the I/O device to write data to the memory connected to other CPU is not received within a predetermined time after the request is transmitted, the PCIe bus control unit 42b performs the following processing when the abnormality is detected. That is, after detecting the abnormality, the PCIe bus control unit 42b discards the "request to write the data to the memory" received from the PCIe connection unit 28 related to the abnormality. As will be described later, the error occurrence address is set to the error occurrence address register 98, and the trap is generated by using the trap generation unit 97. Since this trap notifies that the abnormality occurs in the device driver software, the recovery processing is performed. As an example of the recovery processing, in the case where abnormality occurs in a LAN, transmission/reception data being processed is discarded once, the status of the LAN chip is initialized, and after the initialization, data transmission/reception is performed as usual.

The abnormality detection unit 42c includes a pointer 90, a timer 91, a transmission packet 92, a PA 93, a request 94, and a detection unit 95. The pointer 90, the timer 91, the transmission packet 92, the PA 93, the request 94, and the detection unit 95 are identical to the pointer 80, the timer 81, the transmission packet 82, the PA 83, the request 84, and the detection unit 85, which are described above. Also, the error occurrence address register 98 and the trap generation unit 99 are identical to the error occurrence address register 96 and the trap generation unit 97, which are described above. That is, when a predetermined time has elapsed before the response is received after the packet control unit 37 transmits the request, the abnormality detection unit 37c detects the abnormality of data transmission between the nodes. As in the case of the abnormality detection unit 37c, the abnormality detection unit 42c detects the abnormality of data transmission between the nodes with respect to the read request and the write request transmitted from the request generation unit 42a through the router 40 to other CPU. When the abnormality is detected, as similar to the case of the detection unit 85 of the abnormality detection unit 37c, the detection unit 95 obtains the physical address of the memory of the access target included in the request indicated by the pointer 90 from the PA 93, and records the obtained physical address in the error occurrence address register 98.

When the physical address is recorded in the error occurrence address register 98, the trap generation unit 99 generates the trap.

Figure 12:
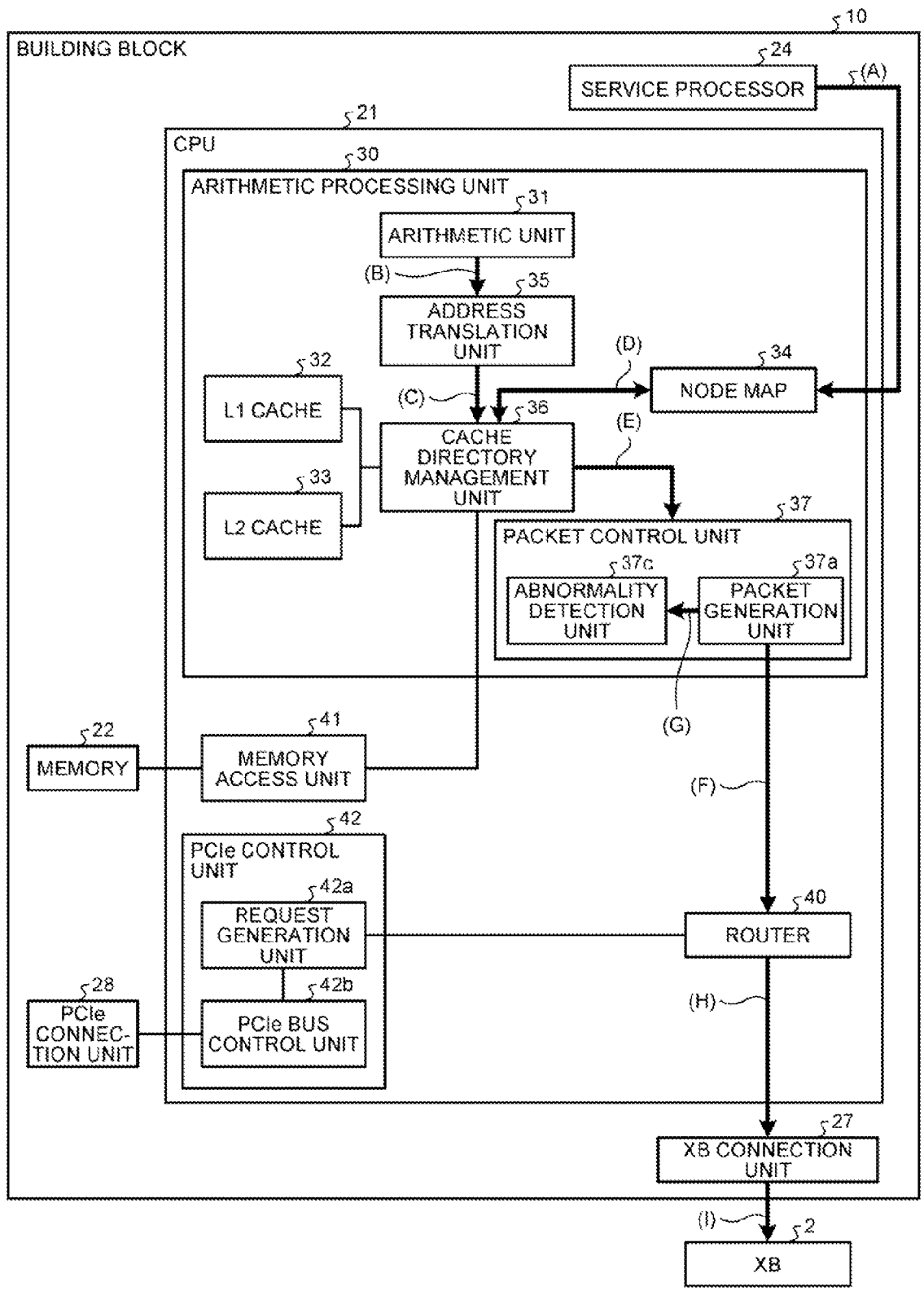
FIG. 12 is a diagram describing an example of processing of causing a CPU to transmit a request according to the first embodiment.

Next, an example of processing of causing the CPU 21 to transmit the request to other CPU will be described with reference to FIG. 12. FIG. 12 is a diagram describing an example of processing of causing a CPU to transmit a request according to the first embodiment. For example, as indicated by (A) of FIG. 12, the setting of the entry in which the CPUID of the CPU accessed to the memory allocated with the physical address and the physical address are matched with each other is performed with respect to the node map 34 from the service processor 24.

Also, the arithmetic unit 31 performs the arithmetic processing, and outputs the logical address being the access target to the address translation unit 35, as indicated by (B) of FIG. 12. The address translation unit 35 translates the logical address into the physical address, and outputs the translated physical address to the cache directory management unit 36, as indicated by (C) of FIG. 12.

Herein, when the cache directory management unit 36 obtains the physical address from the address translation unit 35, the cache directory management unit 36 obtains the CPUID matched with the obtained physical address with reference to the node map 34, as indicated by (D) of FIG. 12. When the obtained CPUID is not the CPUID of the CPU 21, the cache directory management unit 36 outputs the obtained CPUID and physical address to the packet control unit 37, as indicated by (E) of FIG. 12.

In this case, the packet generation unit 37a generates a packet storing the physical address and the CPUID obtained from the cache directory management unit 36, and outputs the generated packet to the router 40, as indicated by (F) of FIG. 12. Also, the packet generation unit 37a outputs data, which represents the transmission of the packet being the request, to the abnormality detection unit 37c, as indicated by (G) of FIG. 12. Subsequently, as indicated by (H) of FIG. 12, the router 40 outputs the packet obtained from the packet generation unit 37a to the XB connection unit 27. Then, as indicated by (I) of FIG. 12, the XB connection unit 27 outputs the obtained packet to the XB 2. The XB 2 transfers the packet to the CPU indicated by the CPUID stored in the packet.

Figure 13:
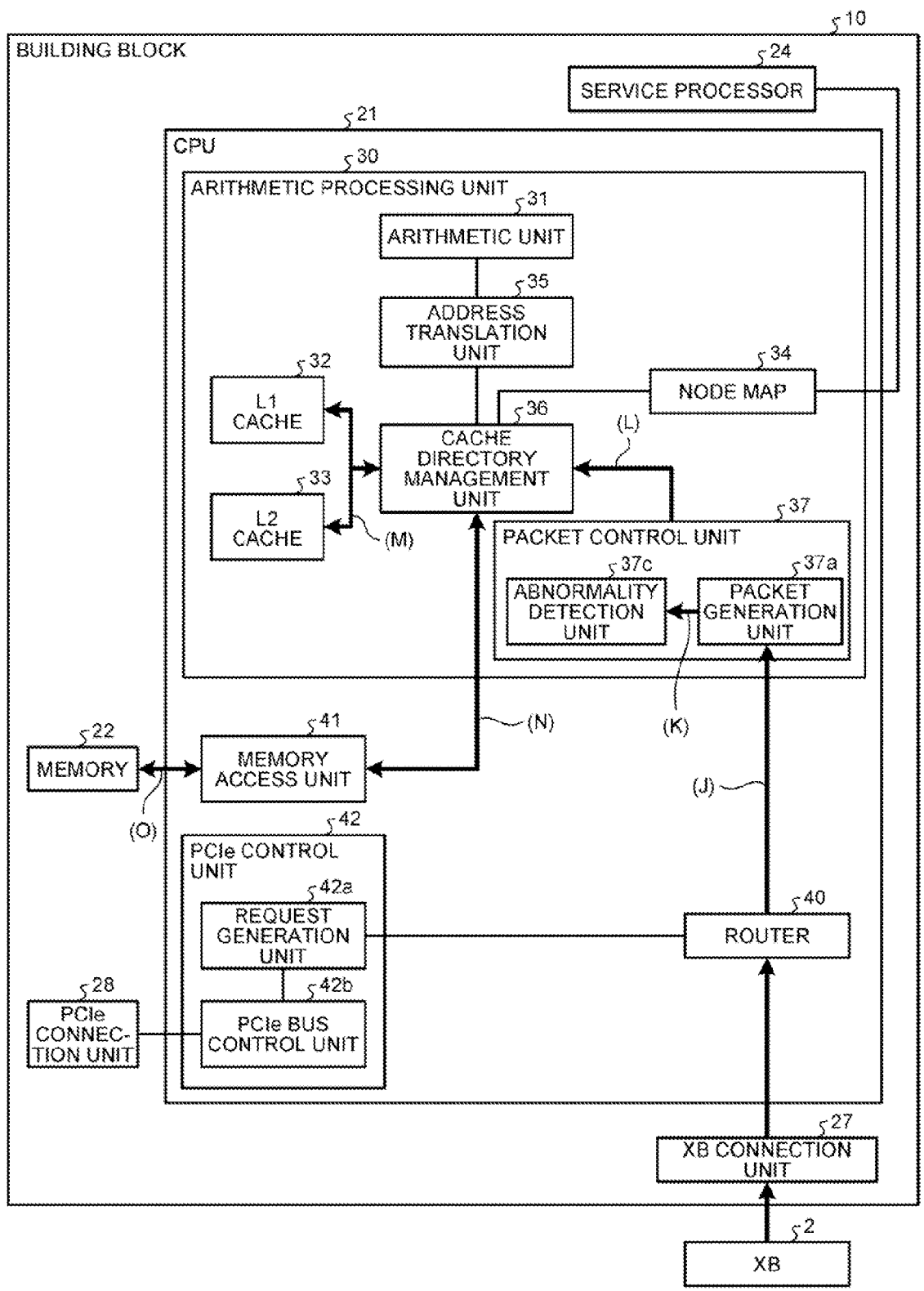
FIG. 13 is a diagram describing an example of processing performed when a CPU receives a packet according to the first embodiment.

Next, an example of processing performed when the CPU 21 receives a packet from other CPU will be described with reference to FIG. 13. FIG. 13 is a diagram describing an example of processing performed when a CPU receives a packet according to the first embodiment. For example, as indicated by (J) of FIG. 13, the packet reception unit 37b receives a packet storing the CPUID of the CPU 21 and the physical address allocated to the memory 22 from other CPU, or a packet of a response.

In this case, when the received packet is the packet of the response, the packet reception unit 37b outputs data, which represents the reception of the packet being the response, to the abnormality detection unit 37c, as indicated by (K) of FIG. 13. The packet reception unit 37b obtains the physical address from the received packet, and outputs the obtained physical address to the cache directory management unit 36, as indicated by (L) of FIG. 13. The cache directory management unit 36 determines whether the storage area indicated by the physical address is the shared area or the local area.

In the case of access to the shared area, the cache directory management unit 36 determines whether data of the storage area indicated by the physical address is cached in the L1 cache 32 or the L2 cache 33, as indicated by (M) of FIG. 13.

Also, when it is determined that the data is not cached, the cache directory management unit 36 outputs the physical address to the memory access unit 41, as indicated by (N) of FIG. 13. As indicated by (O) of FIG. 13, the memory access unit 41 obtains the data of the storage area indicated by the physical address from the memory 22, and outputs the data to the cache directory management unit 36.

When the cache directory management unit 36 obtains the data from the L1 cache 32, the L2 cache 33, or the memory access unit 41, the cache directory management unit 36 instructs that the obtained data be output to the packet control unit 37, and the obtained data be transmitted to the CPU of the request source.

Figure 14:
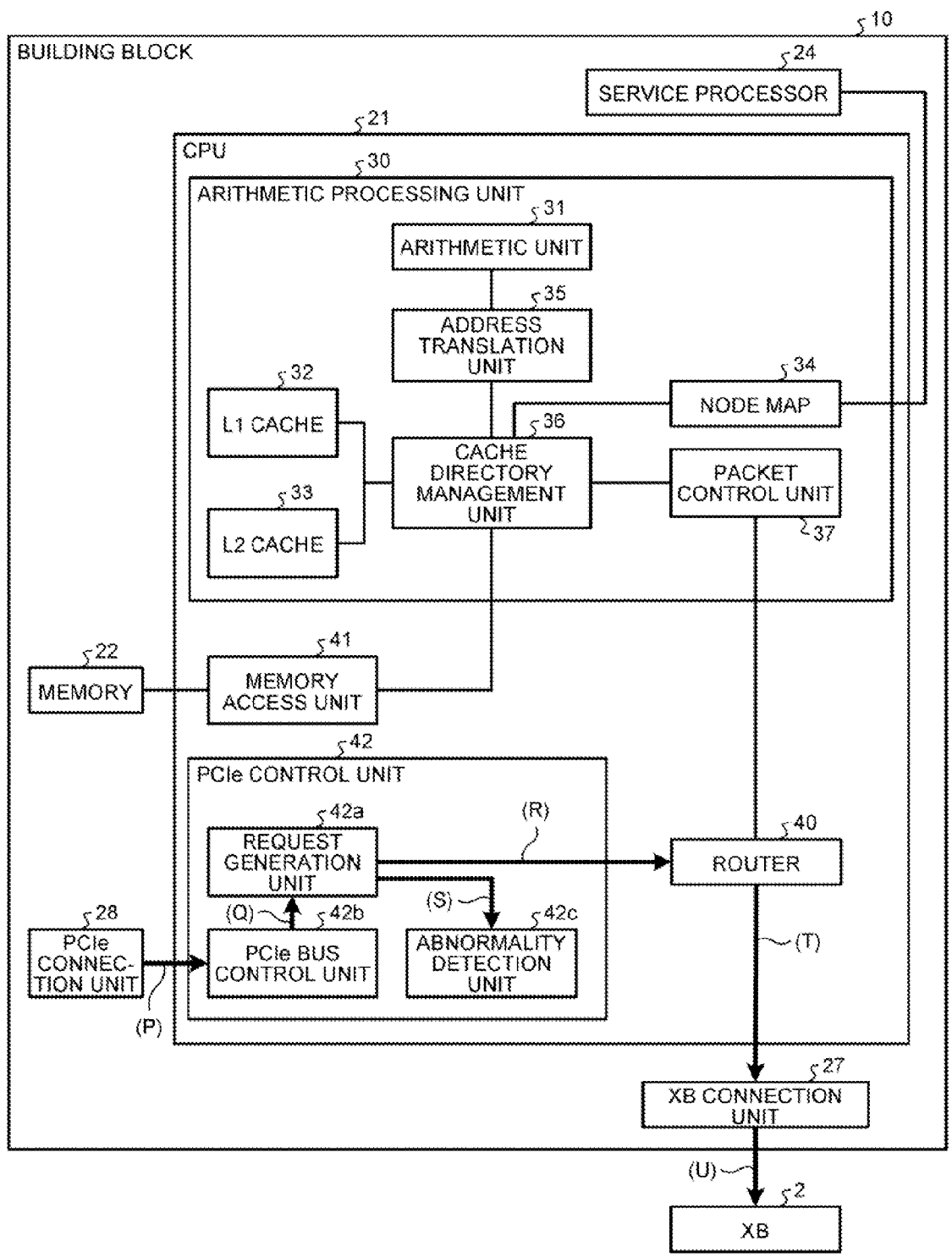
FIG. 14 is a diagram describing an example of processing of causing an I/O device to transmit a request according to the first embodiment.

Next, an example of processing of causing the I/O device to transmit a read or write request to a CPU other than the CPU 21 will be described with reference to FIG. 14. FIG. 14 is a diagram describing an example of processing of causing an I/O device to transmit a request according to the first embodiment. For example, when the PCIe connection unit 28 obtains the physical address and the CPUID from the I/O device, the PCIe connection unit 28 outputs the obtained physical address and CPUID to the PCIe bus control unit 42b, as indicated by (P) of FIG. 14. Also, when the PCIe connection unit 28 obtains the physical address, the CPUID, and the recorded data from the I/O device, the PCIe connection unit 28 outputs the obtained physical address, CPUID, and recorded data to the PCIe bus control unit 42b, as indicated by (P) of FIG. 14.

When the PCIe bus control unit 42b obtains the physical address and the CPUID from the PCIe connection unit 28, the PCIe bus control unit 42b outputs the obtained physical address and CPUID to the request generation unit 42a, as indicated by (Q) of FIG. 14. Also, when the PCIe bus control unit 42b obtains the physical address, the CPUID, and the recorded data from the PCIe connection unit 28, the PCIe bus control unit 42b transmits the obtained physical address, CPUID, and recorded data to the request generation unit 42a, as indicated by (Q) of FIG. 14.

Also, when the request generation unit 42a obtains the physical address and the CPUID from the PCIe bus control unit 42b, the request generation unit 42a generates a packet being a read request, which includes the obtained physical address and CPUID. Also, when the request generation unit 42a obtains the physical address, the CPUID, and the recorded data from the PCIe bus control unit 42b, the request generation unit 42a generates a packet being a write request, which includes the obtained physical address, CPUID, and recorded data. Then, the request generation unit 42a outputs the generated packet to the router 40, as indicated by (R) of FIG. 14.

Also, the request generation unit 42a outputs data, which represents the transmission of the read request and the write request, to the abnormality detection unit 42c, as indicated by (S) of FIG. 14. Subsequently, as indicated by (T) of FIG. 14, the router 40 outputs the request obtained from the request generation unit 42a to the XB connection unit 27. Then, as indicated by (U) of FIG. 14, the XB connection unit 27 outputs the obtained request to the XB 2. The XB 2 transfers the packet to the CPU indicated by the CPUID stored in the request.

Figure 15:
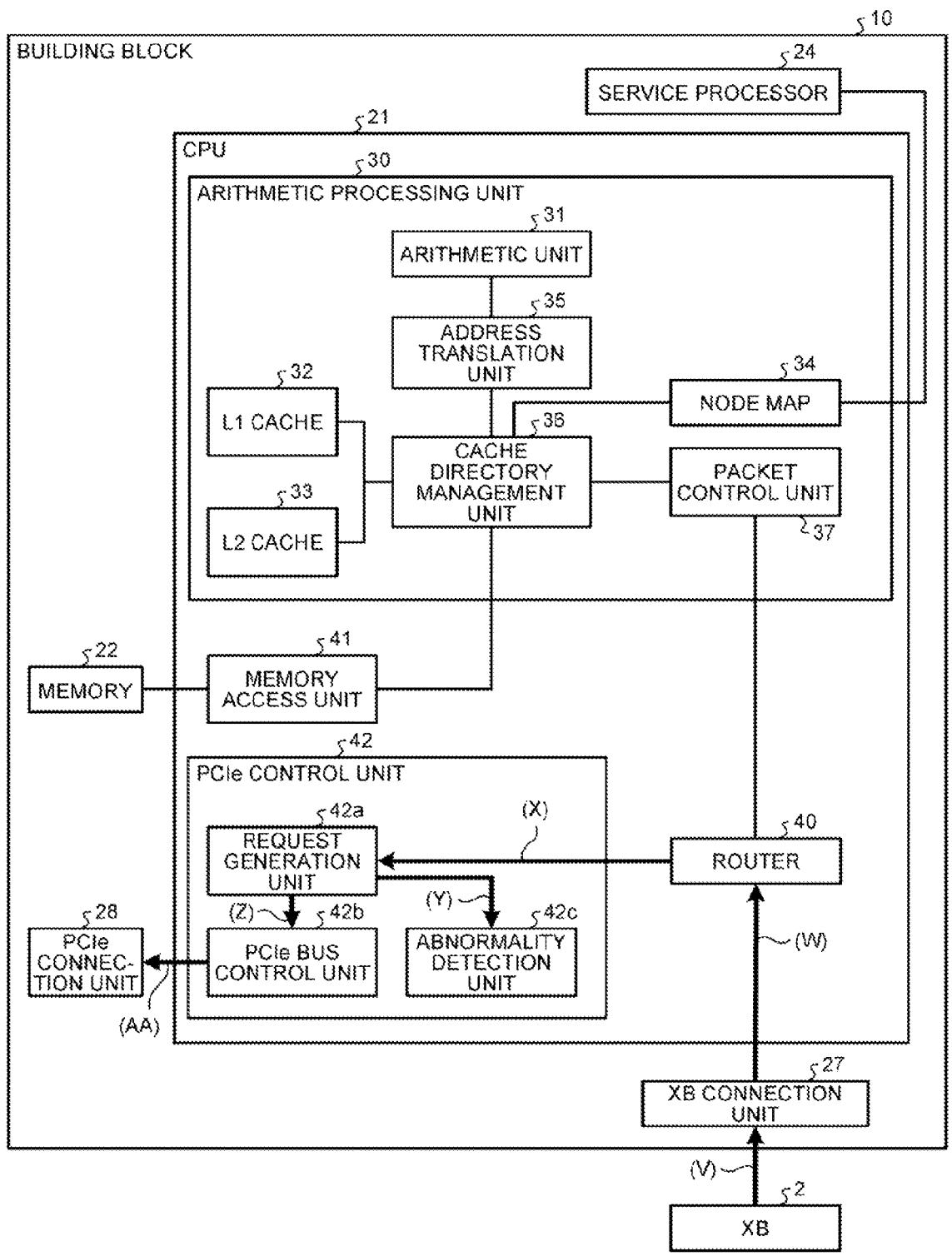
FIG. 15 is a diagram describing an example of processing of causing an I/O device to receive a response according to the first embodiment.

Next, an example of processing of causing the I/O device to receive a response from a CPU other than the CPU 21 will be described with reference to FIG. 15. FIG. 15 is a diagram describing an example of processing of causing an I/O device to receive a response according to the first embodiment. For example, as indicated by (V) of FIG. 15, the XB connection unit 27 receives a response to an I/O device from a CPU other than the CPU 21.

When the XB connection unit 27 receives the response, the XB connection unit 27 outputs the received response to the router 40, as indicated by (W) of FIG. 15. When the router 40 receives the response, the router 40 outputs the received response to the request generation unit 42a, as indicated by (X) of FIG. 15. When the request generation unit 42a receives the response, the request generation unit 42a outputs data, which represents the reception of the response, to the abnormality detection unit 42c, as indicated by (Y) of FIG. 15.

Also, the request generation unit 42a outputs the response to the PCIe bus control unit 42b, as indicated by (Z) of FIG. 15. When the PCIe bus control unit 42b receives the response, the PCIe bus control unit 42b outputs the received response to the PCIe connection unit 28, as indicated by (AA) of FIG. 15. In this way, the response is transmitted from the PCIe connection unit 28 to the I/O device.

Figure 16:
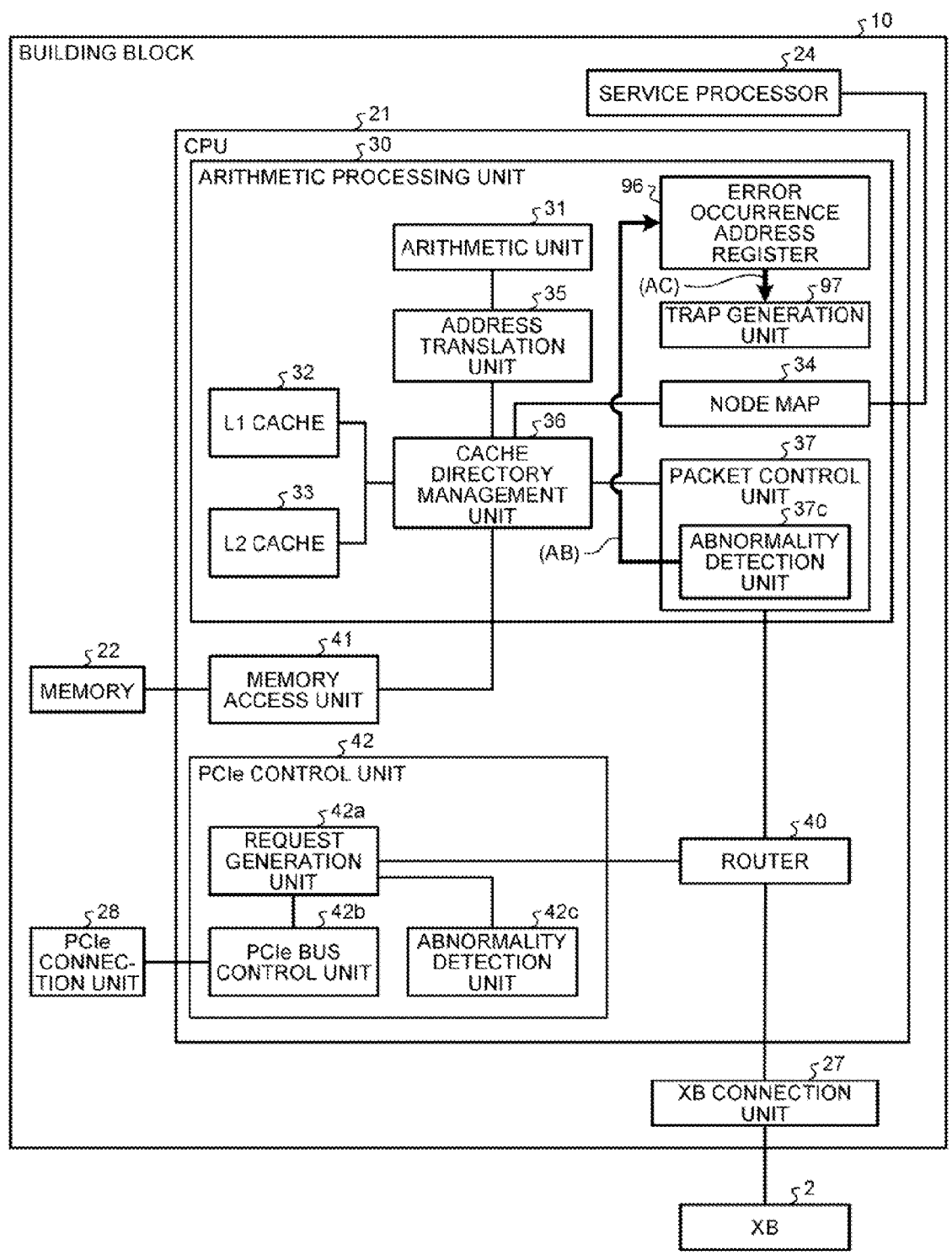
FIG. 16 is a diagram describing an example of processing performed when abnormality of data transmission occurs between a node and a node including a memory of an access target of the corresponding node.

Next, an example of processing performed when abnormality of data transmission occurs between a node 20 and a node including a memory of an access target of the node 20 will be described with reference to FIGS. 16 and 17. FIG. 16 is a diagram describing an example of processing performed when abnormality of data transmission occurs between a node and a node including a memory of an access target of the corresponding node. For example, the abnormality detection unit 37c determines whether the time of the timer 81 has passed by a predetermined time. When the predetermined time has elapsed, the response to the request indicated by the pointer 80 is not received within the predetermined time. Therefore, the abnormality detection unit 37c detects that the abnormality of data transmission occurs between the node 20 and the node including the memory of the access target. The abnormality detection unit 37c obtains the physical address of the memory of the access target, which is included in the request indicated by the pointer 80, from the PA 83, and records the obtained physical address in the error occurrence address register 96, as indicated by (AB) of FIG. 16. When the physical address is recorded in the error occurrence address register 96, the trap generation unit 97 generates the trap as indicated by (AC) of FIG. 16.

Figure 17:
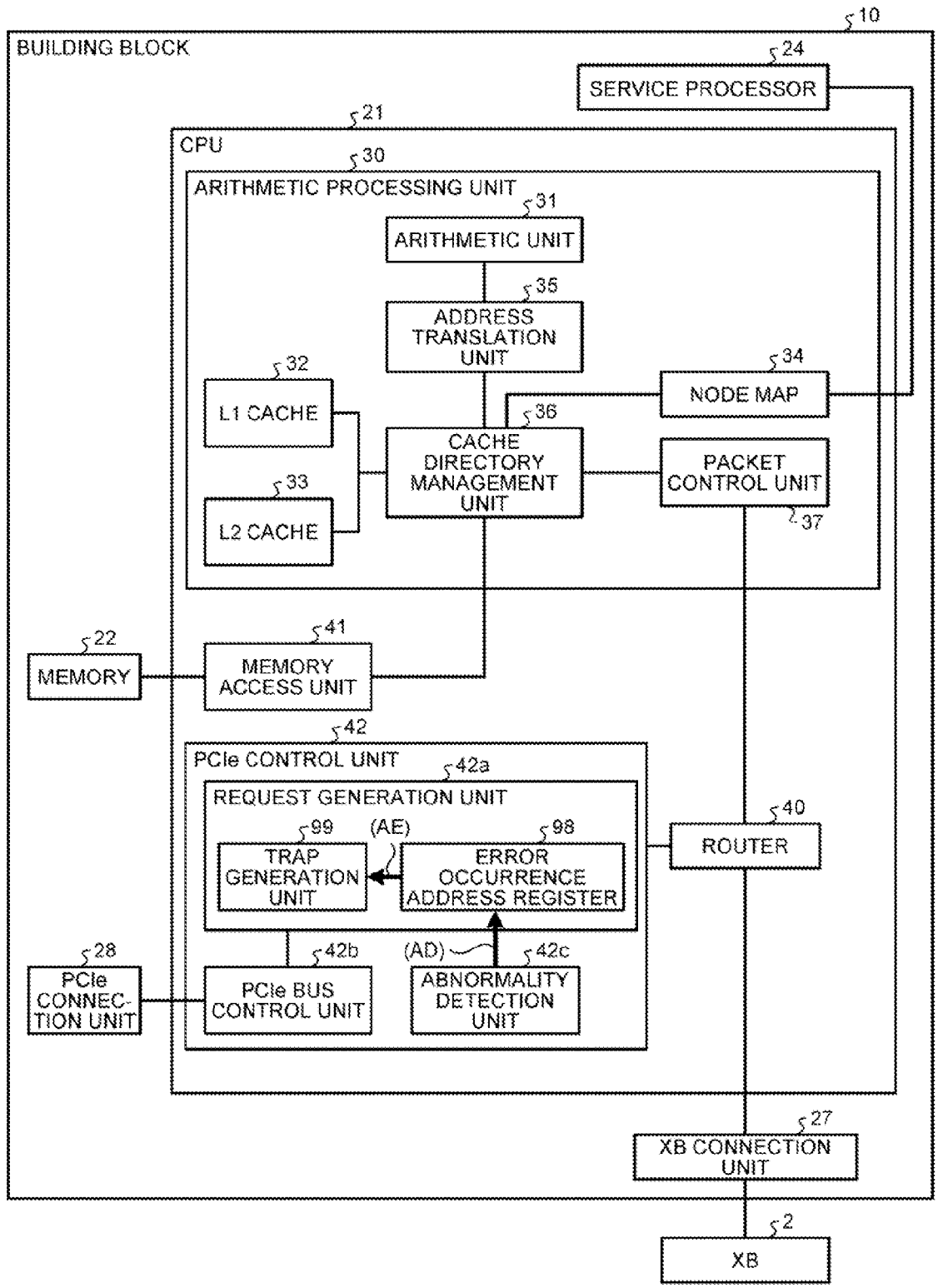
FIG. 17 is a diagram describing an example of processing performed when abnormality of data transmission occurs between a node and a node including memory of an access target of the corresponding node.

FIG. 17 is a diagram describing an example of processing performed when abnormality of data transmission occurs between a node and a node including a memory of an access target of the corresponding node. For example, the abnormality detection unit 42c determines whether the time of the timer 91 has passed by a predetermined time. When the predetermined time has elapsed, the response to the request indicated by the pointer 90 is not received within the predetermined time. Therefore, the abnormality detection unit 42c detects that the abnormality of data transmission occurs between the node 20 and the node including the memory of the access target. The abnormality detection unit 42c obtains the physical address of the memory of the access target, which is included in the request indicated by the pointer 90, from the PA 93, and records the obtained physical address in the error occurrence address register 98, as indicated by (AD) of FIG. 17. When the physical address is recorded in the error occurrence address register 98, the trap generation unit 99 generates the trap, as indicated by (AE) of FIG. 17.

The communication unit 23, the service processor 24, the XB connection unit 27, the XB connection unit 27a, and the PCIe connection unit 28 are electronic circuits. Herein, as an example of the electronic circuits, an integrated circuit such as an Application Specific Integrated Circuit (ASIC), a Field Programmable Gate Array (FPGA) or the like, a CPU, or a Micro Processing Unit (MPU) may be applied. Also, instead of the CPUs 21 to 21c, an integrated circuit such as an ASIC, an FPGA or the like, an MPU, or the like may be applied.

Also, the memories 22 to 22a are semiconductor memory devices such as Random Access Memory (RAM), Read Only Memory (ROM), or flash memory. Also, the L1 cache 32 and the L2 cache 33 are high-speed semiconductor memory devices such as Static Random Access Memory (SRAM).

Next, processing of causing the respective CPUs 21 to 21c to retain the cache coherence will be described. Also, in the following description, it is assumed that the respective CPUs of the information processing system 1 retain the cache coherence by using the Illinois protocol.

Also, in the following description, it is assumed that the respective memories included in the information processing system 1 are identified as memories having a space cacheable from all the CPUs. Also, in the following description, a CPU that is physically and directly connected through a MAC within the CPU to a memory storing data being a cache target is referred to as a home CPU, and a CPU that requests the access is referred to as a local CPU.

Also, a CPU that already transmits the request to the home CPU and completes the cache of the data is referred to as a remote CPU. Also, there is the case where the local CPU and the home CPU are the same CPU, or the case where the local CPU and the remote CPU are the same CPU.

The local CPU determines that the physical address being the access target is allocated to the memory accessed by the home CPU, with reference to its own node map. The local CPU issues the request storing the physical address to the home CPU. Also, in the request issued by the local CPU, a plurality of types of requests exist. For this reason, the cache directory management unit included in the home CPU performs cache coherence control according to the type of obtained request.

For example, as the type of request issued by the local CPU, there are a share-type fetch access, an exclusive-type fetch access, a cache invalidation request, a cache replace request, and the like. The share-type fetch access, for example, is an execution request of "MoveIn to Share", and is a request issued when a data read is performed from a memory accessed by the home CPU.

Also, the exclusive-type fetch access, for example, is an execution request of "MoveIn Exclusively" and is issued when a data load to a cache is performed, in the case where a data store is performed to the memory accessed by the home CPU. Also, the cache invalidation request, for example, is an execution request of "MoveOut", and is issued when an invalidation of a cache line is requested to the home CPU. Also, when the home CPU receives the cache invalidation request, the home CPU may issue the cache invalidation request to the remote CPU, or may issue an order to invalidate the cache.

The cache replace request, for example, is an execution request of "WriteBack", and is issued when updated cache data, that is, cache data of a "Modified" status, is written back to the memory accessed by the home CPU. Also, the cache replace request, for example, is an execution request of "FlushBack", and is issued when a discard of unupdated cache data, that is, cache of a "Shared" or "Exclusive" status, is performed.

When the home CPU receives the above-described request from the local CPU or the remote CPU, the home CPU issues an order to the local CPU or the remote CPU so as to process the request. Herein, the home CPU issues a plurality of types of orders so as to perform the cache coherence control according to the type of obtained request. For example, the home CPU issues "MoveOut and Bypass to Share" that loads data cached by the remote CPU on the local CPU.

Also, for example, the home CPU invalidates the caches of all remote CPUs other than the local CPU, and then, the home CPU issues "MoveOut and Bypass Exclusively" so as to transmit data to the local CPU. Also, the home CPU issues "MoveOut WITH Invalidation" that requests the invalidation of the cache to the remote CPU. Also, when the home CPU issues "MoveOut WITH Invalidation", the caches of all the CPUs become an "Invalidate" status with respect to the target address. Also, when the transaction is completed, the local CPU caches the data.

Also, the home CPU issues "MoveOut for Flush" that requests the invalidation of the cache line to the remote CPU. Also, when the home CPU issues "MoveOut for Flush", the target data is stored only in the memory of the home CPU. Also, when the status of the target data is "Shared", the home CPU issues "Buffer Invalidation" that requests the discard of the cache to the remote CPU.

The home CPU issues the above-described order according to the type of request, and changes the status of the data cached by the respective CPUs. Also, when the local CPU or the remote CPU receives the order, the local CPU or the remote CPU performs the processing indicated by the order, and changes the status of the data cached by the local CPU or the remote CPU itself.

Then, the local CPU or the remote CPU transmits a completion response to the order or data-attached completion response to the home CPU. Also, after the home CPU or the remote CPU performs the order processing, the home CPU or the remote CPU transmits a data-attached request response to the local CPU.

[Flow of Processing]

Figure 18:
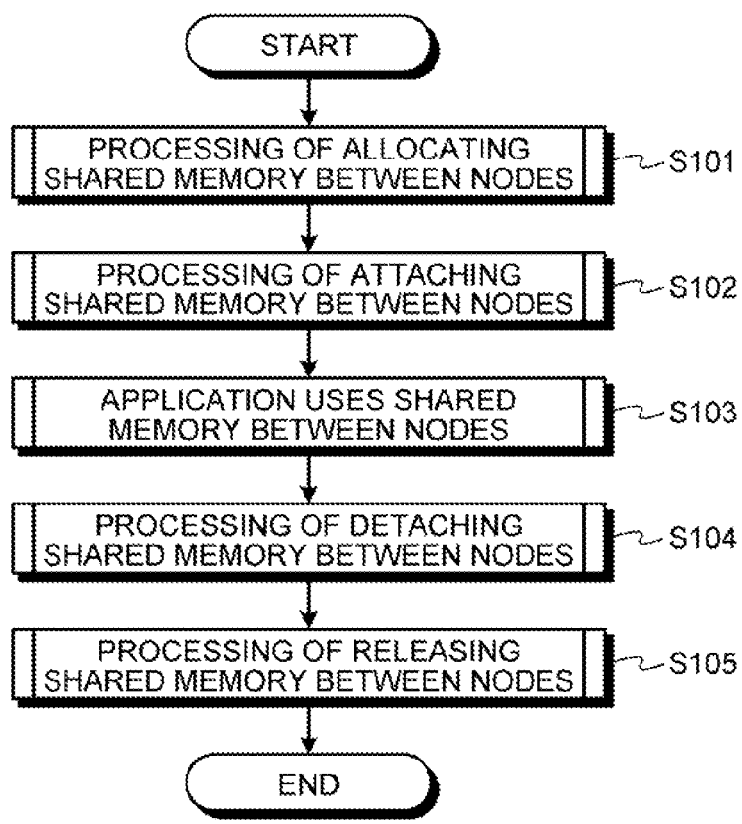
FIG. 18 is a flow chart describing a flow of processing of controlling a shared area.

Next, the flow of the processing of causing the information processing system 1 to control the shared area will be described with reference to FIG. 18. FIG. 18 is a flowchart describing a flow of the processing of controlling a shared area. First, the information processing system 1 performs processing of allocating a shared memory between nodes according to a request from an application (step S101). Then, the information processing system 1 performs processing of attaching the shared memory that is shared between the nodes (step S102).

Then, the application executed by the respective CPUs included in the information processing system 1 uses the respective memories (step S103). Then, the information processing system 1 performs processing of detaching the shared memory (step S104). Then, the information processing system 1 performs processing of releasing the shared memory (step S105), and ends the processing. Also, steps S101 and step S105 may be performed by only the application on the home node of the shared memory. The actual processing is nop, but step S101 and step S105 may also be performed by the application on the node other than the home node of the shared memory.

Figure 19:
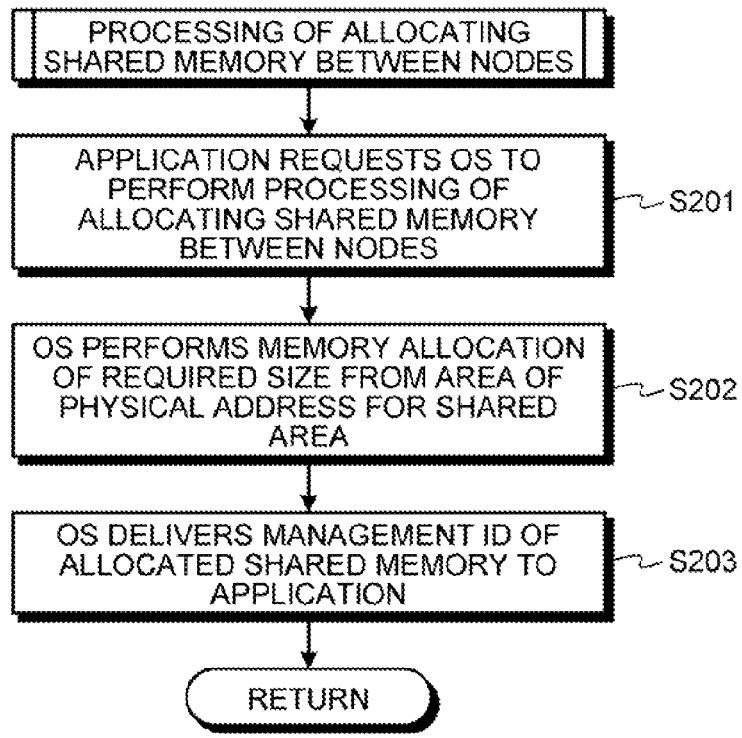
FIG. 19 is a flow chart describing shared memory allocating processing.

Next, the flow of the processing of allocating the shared memory, which is represented by step S101 of FIG. 18, will be described with reference to FIG. 19. FIG. 19 is a flowchart describing the processing of allocating the shared memory. In the example illustrated in FIG. 19, for example, the application executed by the CPU 21 requests the OS to perform the processing of allocating the shared memory between the nodes (step S201).

The OS executed by the CPU 21 performs a memory allocation of a size requested by the application from an area of a physical address for a shared area (step S202). Next, a management ID of the shared memory allocated by the OS is delivered to the application (step S203), and the processing of allocating the shared memory is ended.

Figure 20:
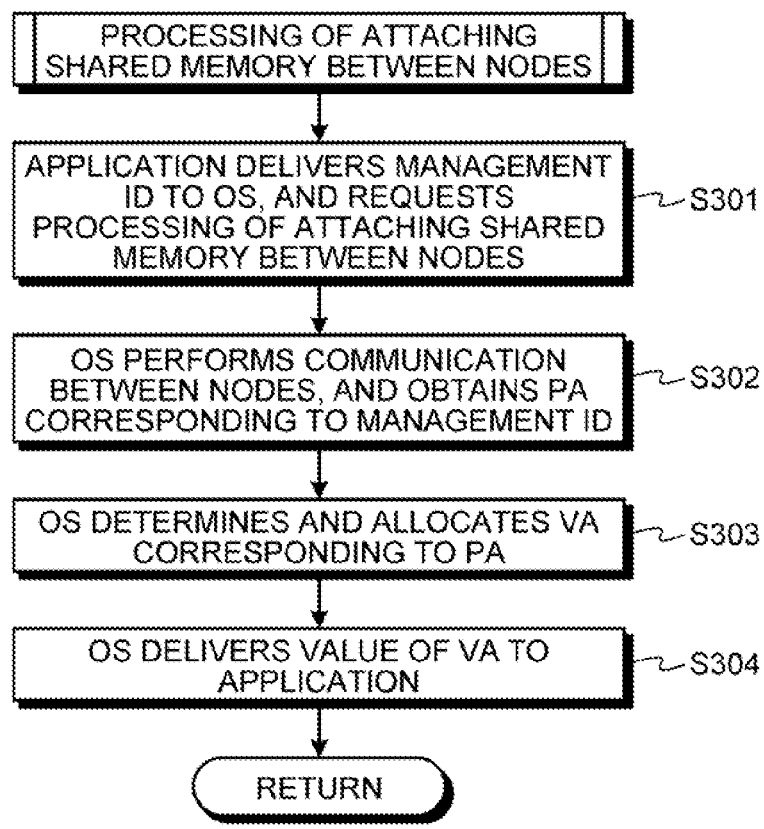
FIG. 20 is a flow chart describing shared memory attaching processing.

Next, the flow of the processing of attaching the shared memory between the nodes, which is represented by step S102 of FIG. 18, will be described with reference to FIG. 20. FIG. 20 is a flowchart describing the processing of attaching the shared memory. First, the application delivers the management ID to the OS, and requests the processing of attaching the shared memory between the nodes (step S301). In this case, the OS communicates with an OS executed in another node, and obtains a physical address corresponding to the management ID (step S302).

Herein, when the OS communicates with the OS executed in the other node, communication by a LAN or the like, communication between the respective nodes through the service processor 24, or the like is used. Also, the OS executed in each node may set a specific shared area as an area used for the communication between the nodes, and perform the communication by storing or reading information on the set area.

Then, the OS determines a logical address corresponding to the physical address, and performs an allocation (step S303). For example, the OS executed in the CPU 21 sets a TLB 35a of the physical address and the logical address to the address translation unit 35.

Also, the logical addresses used by the respective CPUs 21 to 21c may be in an overlapped range, and may also be in different ranges at each CPU. Also, the logical addresses used by the respective CPUs 21 to 21c may be designated to the OS by the application. Then, the OS delivers the value of the logical address to the application (step S304), and ends the processing.

Figure 21:
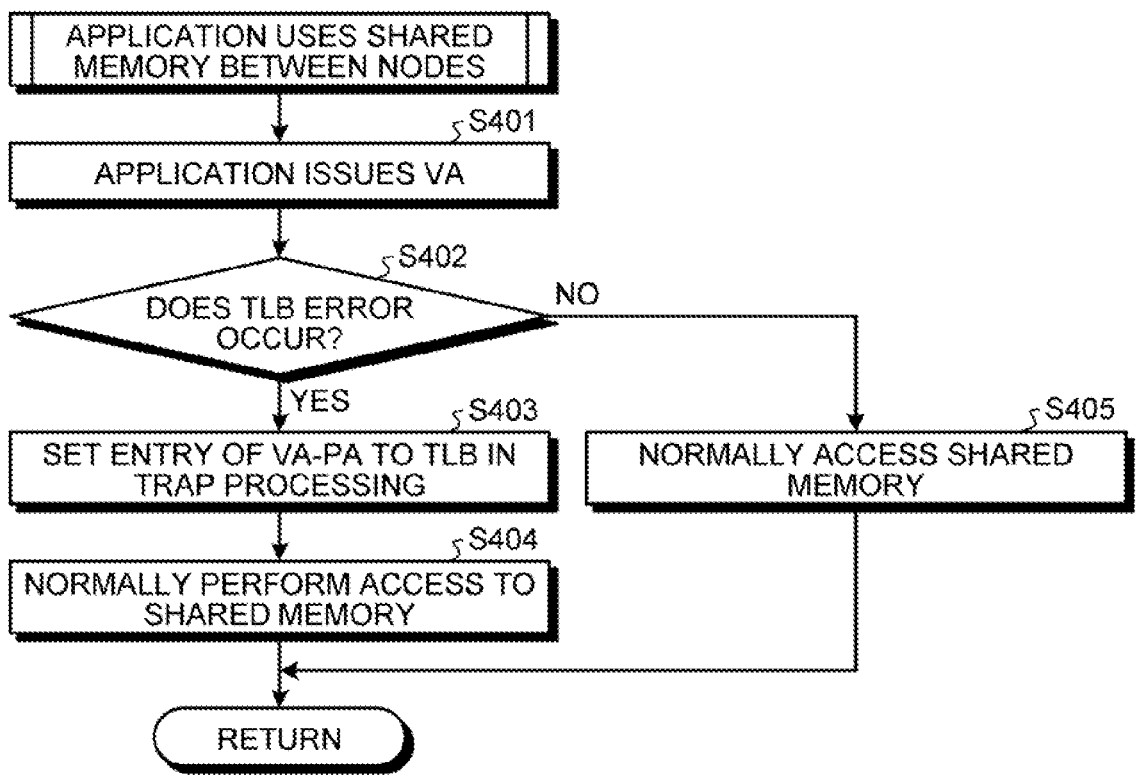
FIG. 21 is a flow chart describing processing of causing an application to use a shared memory.

Next, the flow of the processing of attaching the shared memory between the nodes, which is represented by step S103 of FIG. 18, will be described with reference to FIG. 21. FIG. 21 is a flowchart describing the processing of using the shared memory by the application. For example, the application executed by the CPU 21 issues the logical address and performs the access to the storage area indicated by the logical address (step S401).

The CPU 21 determines whether a TLB miss occurs (step S402). When the TLB miss occurs (YES in step S402), the CPU 21 performs the trap processing and sets an entry of a set of the logical address and the physical address to the TLB (step S403).

Then, the application issues the logical address again, and normally performs the access to the shared memory through the translation into the physical address by the TLB (step S404), and then ends the processing. On the other hand, when the TLB miss does not occur (NO in step S402), the access to the shared memory is normally performed (step S405), and the processing is ended.

Next, the flow of the processing of detaching the shared memory between the nodes, which is represented by step S104 of FIG. 18, will be described with reference to FIG. 22. FIG. 22 is a flowchart describing the processing of detaching the shared memory between the nodes. For example, the application executed by the CPU 21 designates the logical address or the management ID of the shared memory between the nodes to the OS, and requests the detach processing (step S501).

The OS executed by the CPU 21 performs a flush of a cache (step S502). In other words, in the case where the OS performs the allocation as the shared memory again after the deallocation of the shared memory, the status of the cache and the status of the actual memory are not matched with each other if the home node of the shared memory is rebooted while the allocation as the shared memory is not performed. For this reason, the OS performs the flush of the cache to prevent the state in which the status of the cache and the status of the actual memory are not matched with each other.

The OS deallocates the logical address of the shared memory between the nodes, that is, the range used by the application, and deletes the entry of the TLB 35a related to the deallocated logical address (step S503). Also, after that, on the present node, even though the TLB miss occurs with respect to the detach-completed memory address (YES in step S402), the OS does not set the physical address corresponding to the detach-completed logical address to the TLB 35a. Therefore, step S404 is not normally completed, and the access error occurs. After the detach completion, as opposed to step S302, the OS communicates between the nodes, and the present application notifies the completion of the access to the PA of the shared memory (step S504). When the release of the shared memory is completed on the home node and the application is the last user of the shared memory, the release processing is requested to the home node (step S505), and the processing is ended.

Next, the flow of the processing of releasing the shared memory between the nodes, which is represented by step S105 of FIG. 18, will be described with reference to FIG. 23. FIG. 23 is a flowchart describing the processing of releasing the shared memory between the nodes. For example, the application executed by the CPU 21 requests the processing of releasing the shared memory between the nodes to the OS (step S601). When all users of the designated shared area are detached, the OS releases the allocation (step S602) and ends the processing. When the detach is not completed, the processing of releasing the allocation is not performed, and the processing is completed (the actual allocation completing processing is performed in step S505).

Next, the flow of the processing of causing the CPU 21 to transmit the request of the memory access to another CPU will be described with reference to FIG. 24. FIG. 24 is a flowchart describing the processing of issuing the request. For example, the arithmetic unit 31 of the CPU 21 issues the logical address (step S701).

The address translation unit 35 performs the translation from the logical address to the physical address (step S702). Then, the cache directory management unit 36 obtains the physical address and performs the cache directory management (step S703). In other words, the cache directory management unit 36 changes the cache status with respect to the storage area indicated by the obtained physical address.

Then, the cache directory management unit 36 determines, with reference to the node map 34, whether the obtained physical address is the physical address allocated to the memory of another node (step S704). When it is determined that the obtained physical address is not the physical address allocated to the memory of another node (NO in step S704), the cache directory management unit 36 performs the memory access by using the obtained physical address (step S705). Then, the processing is ended.

On the other hand, when the obtained physical address is the physical address allocated to the memory of another node (YES in step S704), the cache directory management unit 36 obtains the CPUID matched with the physical address from the node map 34 (step S706). The packet transmission unit generates a packet storing the CPUID and the physical address, that is, a request of memory access, and transmits the packet to the XB 2 (step S707), and ends the processing.

Next, the flow of the processing performed when the CPU 21 receives the request of the memory access from another CPU will be described with reference to FIG. 25. FIG. 25 is a flowchart describing the flow of the processing performed when the request is received. Also, in the example illustrated in FIG. 25, the flow of the processing performed when the CPU 21 receives "MoveIn to Share" or "MoveIn Exclusively" from another CPU will be described with reference to FIG. 25. For example, the CPU 21 receives the request from another CPU through the XB 2 (step S801).

In this case, by using the node map 34, the CPU 21 determines whether the physical address being the request target is the local area (step S802). When the physical address being the request target is the local area (YES in step S802), the CPU sends a negative response to the CPU of the request source (step S803), and ends the processing.

Also, when the physical address being the request target is not the local area (NO in step S802), the CPU 21 performs the cache directory management to retain the coherence (step S804). Also, the CPU 21 determines the status of the storage area indicated by the physical address (step S805).

The CPU 21 issues the order based on the determined status to another CPU (step S806) and changes the status (step S807). Then, the CPU 21 performs the response to transmit data of the storage area indicated by the physical address to the CPU of the request source (step S808), and ends the processing.

Figure 26:
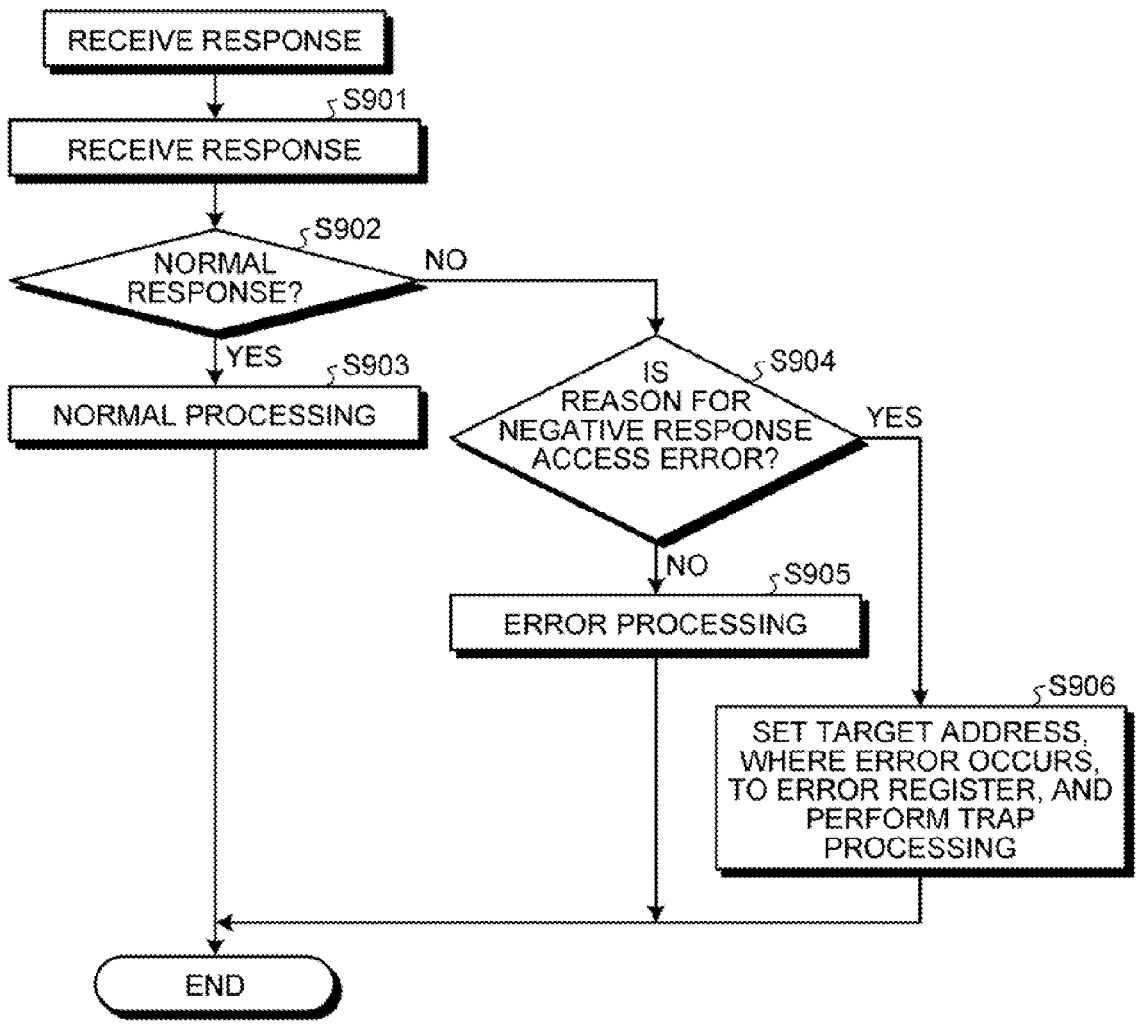
FIG. 26 is a flow chart describing a flow of processing performed when a CPU receives a response.

Next, the flow of the processing performed when the CPU 21 receives the response will be described with reference to FIG. 26. FIG. 26 is a flowchart describing the flow of the processing performed when the CPU receives the response. For example, the CPU 21 receives the response (step S901). In this case, the CPU 21 determines whether the contents of the response are a normal response (step S902).

When the contents of the response are normal, that is, when the CPU 21 receives the data of the request target (YES in step S902), the CPU 21 performs the normal processing by using the data (step S903), and ends the processing. On the other hand, when the CPU 21 receives a negative response (NO in step S902), the CPU 21 determines whether the reason for the negative response is an access error (step S904).

When the reason for the negative response is not the access error (NO in step S904), the CPU 21 performs a typical error processing (step S905) and ends the processing. On the other hand, when the reason for the negative response is the access error (YES in step S904), the CPU 21 sets the physical address, where the error occurs, to an error register, and performs the trap processing (step S906), and ends the processing.

Figure 27:
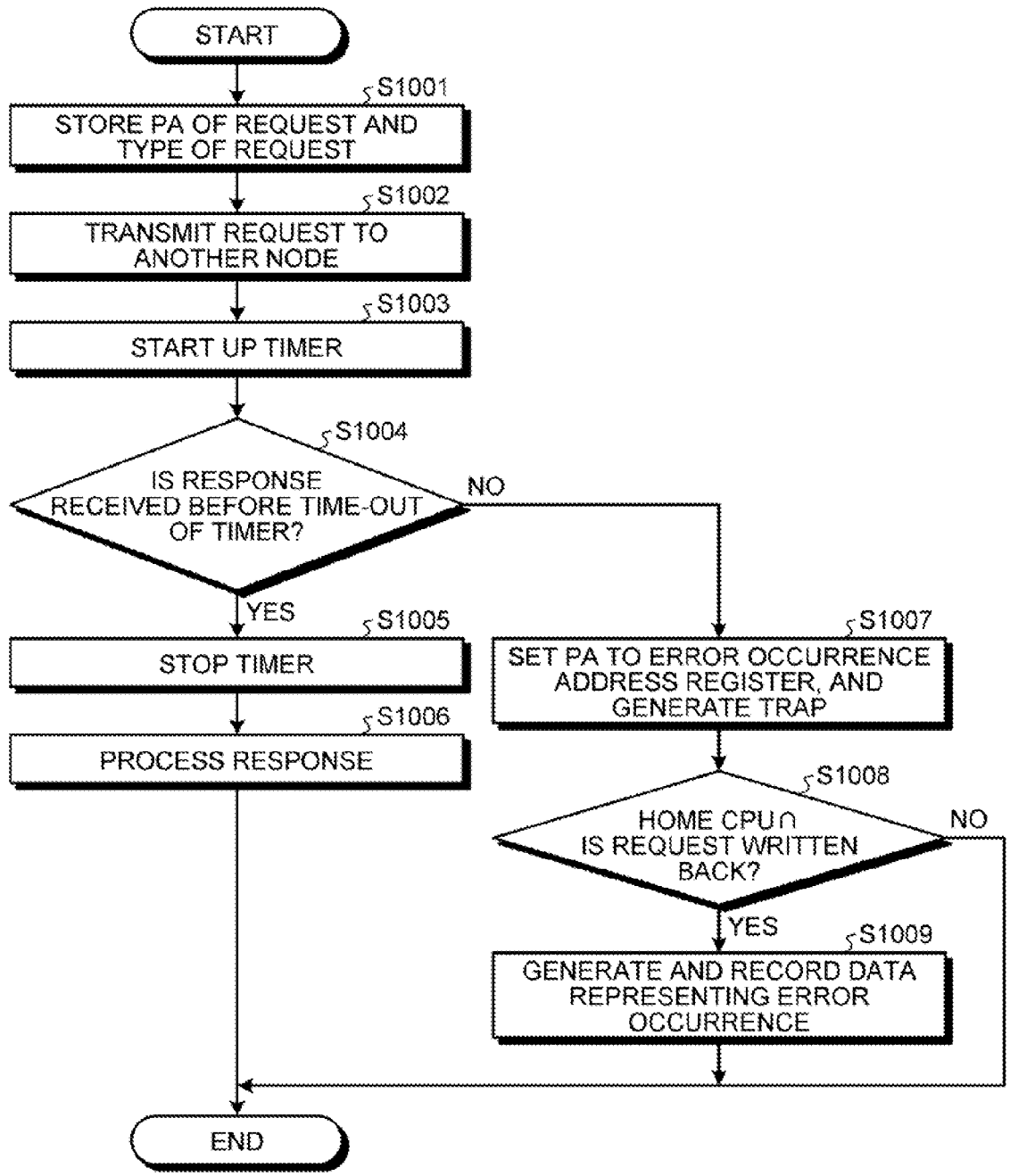
FIG. 27 is a flow chart describing a flow of processing performed when a CPU transmits a request.

Next, the flow of the processing performed when the CPU 21 transmits the request will be described with reference to FIG. 27. FIG. 27 is a flowchart describing the flow of the processing performed when the CPU transmits the request. For example, the CPU 21 stores the physical address of the access destination, which is included in the request, in the PA 83, and stores the type of request in the request 84 (step S1001). The CPU 21 transmits the request to the CPU of another node (step S1002). Then, the CPU 21 starts up the timer 81 (step S1003).

Then, the CPU 21 determines whether the response to the request is received before the time-out, that is, before a predetermined time has elapsed after the transmission of the request (step S1004). When the response is received before the time-out (YES in step S1004), the CPU 21 stops the timer 81 (step S1005). Then, the CPU 21 processes the response (step S1006) and ends the processing.

On the other hand, when the response to the request is not received before the time-out (NO in step S1004), the CPU 21 performs the following processing. That is, the CPU 21 specifies the physical address stored in the PA 83 corresponding to the request, sets the specified physical address to the error occurrence address register 96, and generates the trap (step S1007). Then, regarding the CPU connected to the memory having the storage area indicated by the specified physical address, the CPU 21 determines whether the CPU 21 is the home CPU and the instruction to write back the dirty cache data to the memory 22 is included in the request (step S1008).

When the CPU 21 is the home CPU and the instruction to write back the dirty cache data to the memory 22 is included in the request (YES in step S1008), the CPU 21 performs the following processing. That is, the CPU 21 generates a value representing abnormality that cache data written back to the shared memory of the memory 22 is not written back, and records the generated value in a predetermined area of the directory 36a. Alternatively, the CPU 21 generates data representing the error state in the area of the shared area of the memory 22 where the cache data is written back by the crashed node, and records the generated data (step S1009). Then, the processing is ended. Also, when the CPU 21 is not the home CPU, or when the instruction to write back the dirty cache data to the memory 22 is not included in the request (NO in step S1008), the processing is ended.

Figure 28:
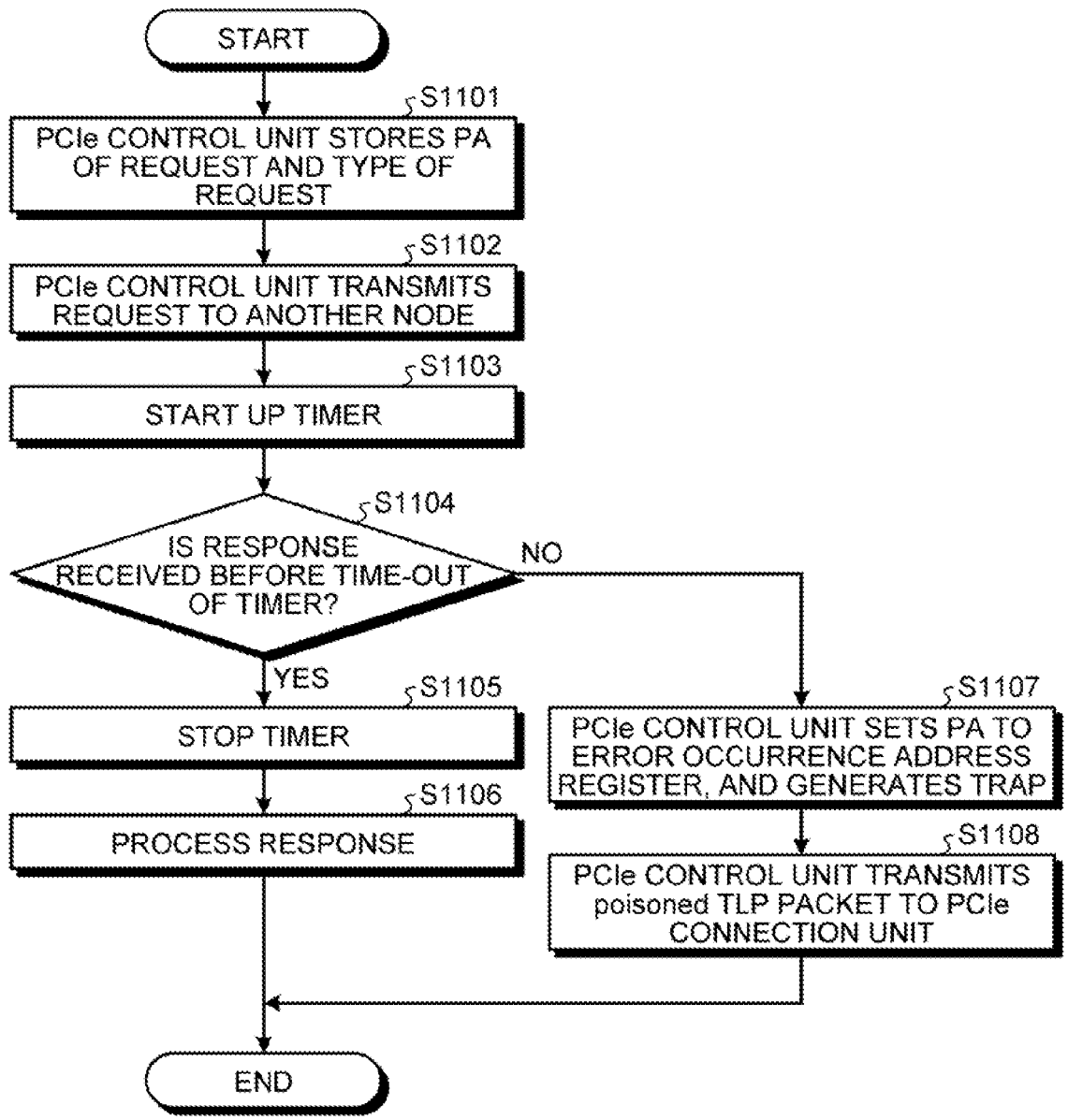
FIG. 28 is a flow chart describing a flow of processing performed when a PCIe control unit transmits a read request.

Next, the flow of the processing performed when the PCIe control unit 42 transmits the read request will be described with reference to FIG. 28. FIG. 28 is a flowchart describing the flow of the processing performed when the PCIe control unit transmits the read request. For example, the PCIe control unit 42 stores the physical address of the access destination, which is included in the request, in the PA 83, and stores the type of request in the request 84 (step S1101). The PCIe control unit 42 transmits the request to the CPU of another node (step S1102). Then, the PCIe control unit 42 starts up the timer (step S1103).

Then, the PCIe control unit 42 determines whether the response to the request is received before the time-out (step S1104). When the response is received before the time-out (YES in step S1104), the PCIe control unit 42 stops the timer 91 (step S1105). Then, the PCIe control unit 42 processes the response (step S1106) and ends the processing.

On the other hand, when the response to the request is not received before the time-out (NO in step S1104), the PCIe control unit 42 performs the following processing. That is, the PCIe control unit 42 specifies the physical address stored in the PA 83 corresponding to the request, sets the specified physical address to the error occurrence address register 98, and generates the trap (step S1107). Then, the PCIe control unit 42 generates a "poisoned TLP" packet and transmits the generated "poisoned TLP" packet to the PCIe connection unit (step S1108), and ends the processing.

Figure 29:
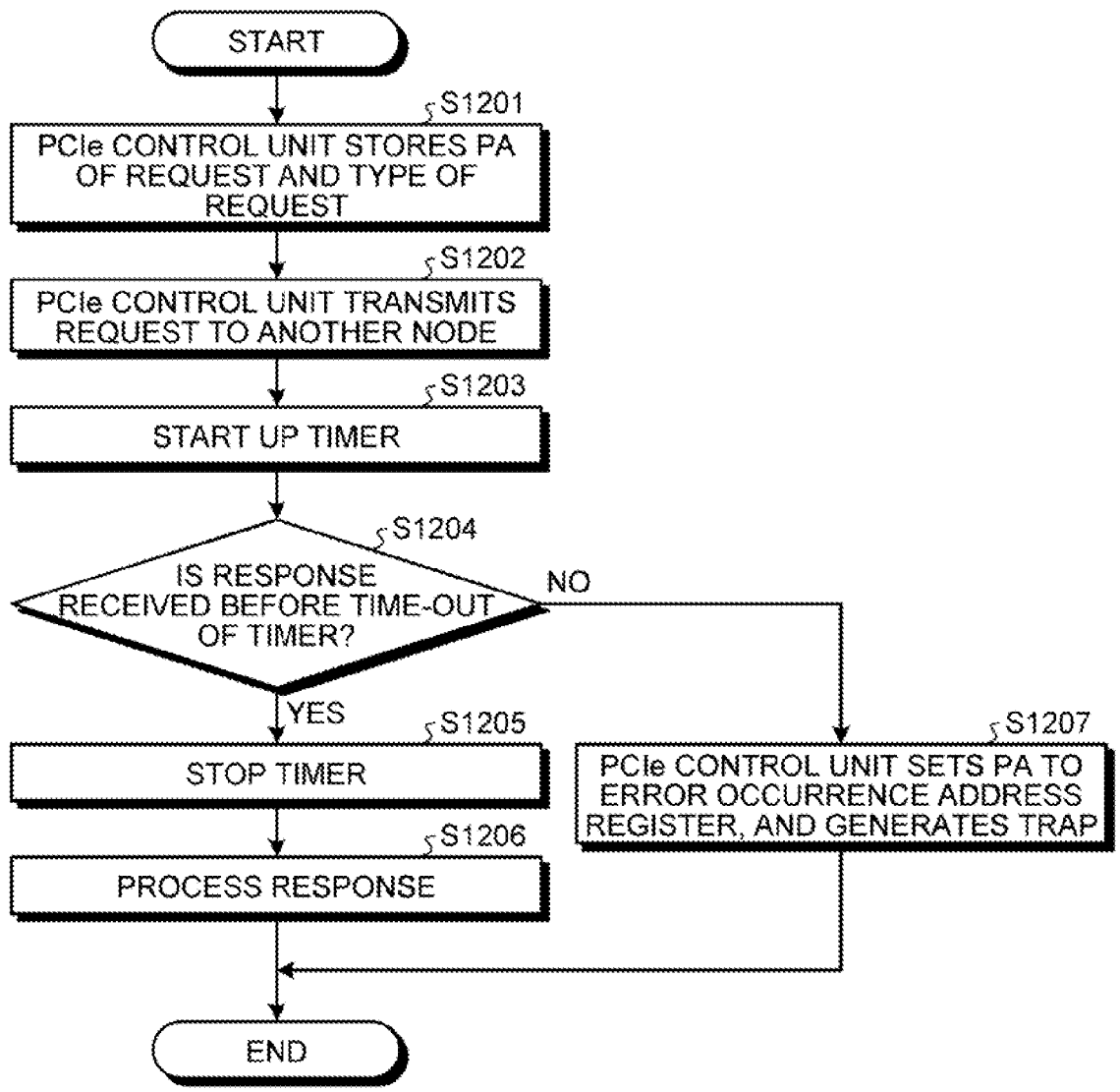
FIG. 29 is a flow chart describing a flow of processing performed when a PCIe control unit transmits a write request.

Next, the flow of the processing performed when the PCIe control unit 42 transmits the write request will be described with reference to FIG. 29. FIG. 29 is a flowchart describing the flow of the processing performed when the PCIe control unit transmits the write request. For example, the PCIe control unit 42 stores the physical address of the access destination, which is included in the request, in the PA 83, and stores the type of request in the request 84 (step S1201). The PCIe control unit 42 transmits the request to the CPU of another node (step S1202). Then, the PCIe control unit 42 starts up the timer (step S1203).

Then, the PCIe control unit 42 determines whether the response to the request is received before the time-out (step S1204). When the response is received before the time-out (YES in step S1204), the PCIe control unit 42 stops the timer 91 (step S1205). Then, the PCIe control unit 42 processes the response (step S1206) and ends the processing.

On the other hand, when the response to the request is not received before the time-out (NO in step S1204), the PCIe control unit 42 performs the following processing. That is, the PCIe control unit 42 specifies the physical address stored in the PA 83 corresponding to the request, sets the specified physical address to the error occurrence address register 98, and generates the trap (step S1207), and ends the processing.

Figure 30:
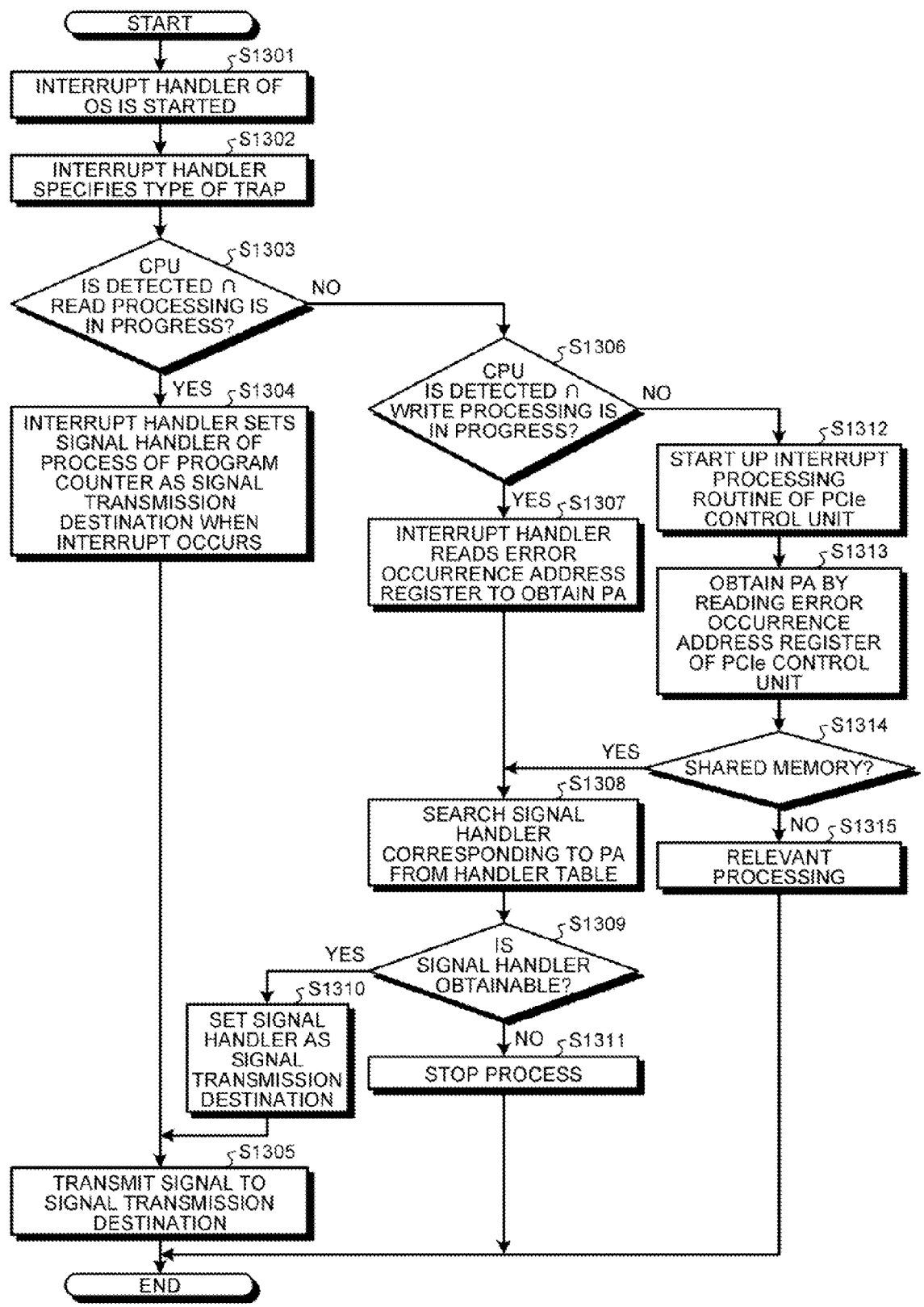
FIG. 30 is a flow chart describing a flow of trap processing performed by an OS due to the generation of trap.

Next, the flow of the trap processing the OS performs by generating the trap will be described with reference to FIG. 30. FIG. 30 is a flowchart describing the flow of the trap processing the OS performs by generating the trap. For example, by generating the trap, the OS executed by the CPU 21 starts up an interrupt handler (step S1301). The interrupt handler specifies the type of trap (step S1302). The interrupt handler determines whether the type of trap represents that the read processing is in progress due to the communication error with the CPU of another node detected by the CPU 21. When the type of trap represents that the read processing is in progress due to the communication error with the CPU of another node detected by the CPU 21 (YES in step S1303), the interrupt handler performs the following processing. That is, the interrupt handler sets a signal handler of a process, which is indicated by a program counter when the interrupt occurs, as a signal transmission destination (step S1304). Then, the interrupt handler transmits a signal to the signal transmission destination (step S1305), and ends the processing.

Also, when the type of trap does not represent that the read processing is in progress due to the communication error with the CPU of another node detected by the CPU 21 (NO in step S1303), the interrupt handler performs the following processing. That is, the interrupt handler determines whether the type of trap represents that the write processing is in progress due to the communication error with the CPU of another node detected by the CPU 21 (step S1306). When the type of trap represents that the write processing is in progress due to the communication error with the CPU of another node detected by the CPU 21 (YES in step S1306), the interrupt handler reads the error occurrence address register 96 and obtains the physical address (step S1307). The interrupt handler searches a handler table for a signal handler corresponding to the obtained physical address (step S1308).

Also, the handler table is created as follows. First, when a memory allocation of a size requested by the application executed by the CPU 21 from an area of a physical address for a shared area is performed by the request of the application, the signal handler is obtained, and an entry address of a function of the obtained signal handler is registered in the handler table. When the entry address of the function of the signal handler is registered in the handler table, the OS performs the following processing. That is, the OS executed by the CPU 21 registers the address of the shared memory and the identifier of the process, which are matched with the entry address of the function of the signal handler, in the handler table. In this way, the handler table is created.

FIG. 31 is a diagram illustrating an example of a data format of a handler table. The handler table illustrated in FIG. 31 includes a "shared memory address" item, a "pid" item, and an "entry address of a function of a signal handler" item. In the "shared memory address" item, the address of the shared memory corresponding to the signal handler, whose entry address is registered in the "entry address of the function of the signal handler" item, is registered. Also, in the "pid" item, the identifier of the process corresponding to the signal handler, whose entry address is registered in the "entry address of the function of the signal handler" item, is registered. In the "entry address of the function of the signal handler" item, the entry address of the function of the signal handler is registered.

Returning to FIG. 30, as the search result, the interrupt handler determines whether the signal handler is obtainable (step S1309). When the signal handler is obtainable (YES in step S1309), the interrupt handler sets the obtained signal handler as the signal transmission destination (step S1310), and proceeds to step S1305. On the other hand, when the signal handler is not obtainable (NO in step S1309), the interrupt handler stops all processes using the shared memory of the shared area indicated by the physical address obtained in step S1307 (step S1311), and ends the processing.

Also, when the type of the trap represents that the write processing is not in progress due to the communication error with the CPU of other node detected by the CPU 21 (NO in step S1306), the interrupt handler may perform the following determination. That is, the interrupt handler may determine that the type of the trap is the communication error with the CPU of other node detected by the PCIe control unit 42. Therefore, the interrupt handler starts up an interrupt processing routine of the PCIe control unit 42 (step S1312). In the interrupt processing performed by the CPU 21, the error occurrence address register 98 of the PCIe control unit 42 is read, and the physical address is obtained (step S1313).

Then, the interrupt handler determines whether the storage area indicated by the obtained physical address is the shared area of the shared memory (step S1314). When the storage area indicated by the obtained physical address is the shared area of the shared memory (YES in step S1314), the processing returns to step S1308. On the other hand, when the storage area indicated by the obtained physical address is not the shared area of the shared memory (NO in step S1314), a predetermined relevant processing is performed (step S1315), and the processing is ended.

Figure 32:
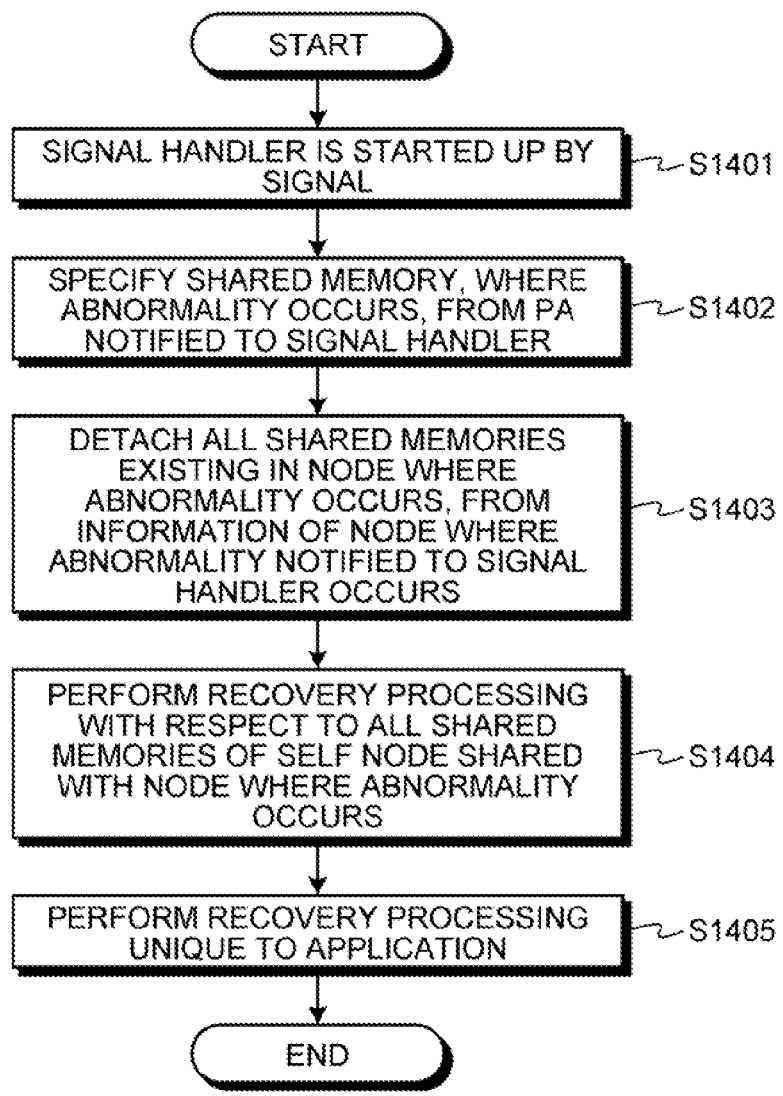
FIG. 32 is a flow chart describing a flow of processing performed by a signal handler to which a signal is notified.

Next, the flow of the processing performed by the signal handler, to which the signal is notified, will be described with reference to FIG. 32. FIG. 32 is a flow chart describing the flow of the processing performed by the signal handler, to which the signal is notified. For example, the interrupt handler notifies the signal to the signal handler and starts up the signal handler (step S1401). The started signal handler specifies the shared memory, where the abnormality occurs, from the physical address notified to the signal handler (step S1402). The signal handler detaches all the shared memories existing in the node, where the abnormality occurs, from the information of the node where the abnormality notified to the signal handler occurs (step S1403).

Then, the signal handler performs the recovery processing on all the shared memories of the node 20 shared with the node where the abnormality occurs (step S1404). Then, the signal handler performs the recovery processing unique to the application (step S1405).

An example of the recovery processing unique to the application will be described. For example, when the CPU 21 executes the application that creates "checkpoint" on an external storage unit such as a disk at regular intervals, the recovery processing may be performed to read data represented by the "checkpoint" and restart the processing. Also, when the CPU 21 executes the application that does not create the "checkpoint", the recovery processing, such as resetting or rebooting processing, may be performed.

Figure 33:
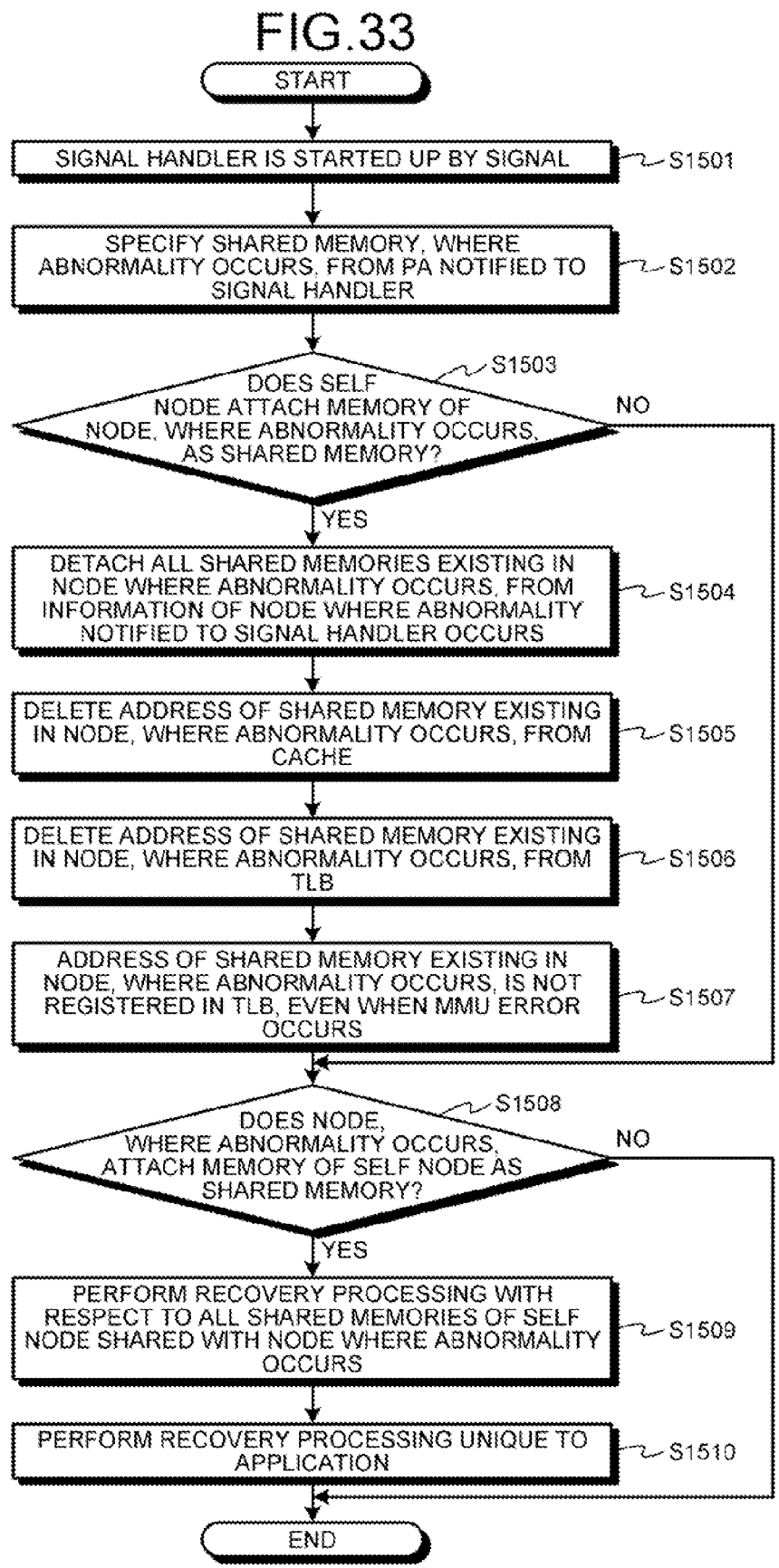
FIG. 33 is a flow chart describing a flow of another processing performed by a signal handler to which a signal is notified.

Also, the processing performed by the signal handler, to which the signal is notified, is not limited to the above-described processing. Thus, the flow of another processing performed by the signal handler, to which the signal is notified, will be described with reference to FIG. 33. FIG. 33 is a flow chart describing the flow of another processing performed by the signal handler, to which the signal is notified. For example, the interrupt handler notifies the signal to the signal handler and starts up the signal handler (step S1501). The started signal handler specifies the shared memory, where the abnormality occurs, from the physical address notified to the signal handler (step S1502). The signal handler determines whether the node 20 (self node) including the CPU 21 executing the signal handler attaches the memory of the node, where the abnormality occurs, as the shared memory (step S1503).

When the self node does not attach the memory of the node, where the abnormality occurs, as the shared memory (NO in step S1503), the signal handler proceeds to step S1508.

On the other hand, when the self node attaches the memory of the node, where the abnormality occurs, as the shared memory (YES in step S1503), the signal handler performs the following processing. That is, the signal handler detaches all the shared memories existing in the node, where the abnormality occurs, from the information of the node where the abnormality notified to the signal handler occurs (step S1504).

Then, the signal handler deletes the address of the shared memory existing in the node, where the abnormality occurs, from the L1 cache and the L2 cache (step S1505). Then, the signal handler deletes the entry including the address of the shared memory existing in the node, where the abnormality occurs, from the TLB 35a (step S1506). Even when the TLB miss occurs, the signal handler sets the physical address, which is notified to the signal handler, as the physical address that inhibits the registration in the TLB 35a (step S1507).

Then, the signal handler determines whether the node, where the abnormality occurs, attaches the memory of the self node as the shared memory (step S1508). When the node, where the abnormality occurs, attaches the memory of the self node as the shared memory (YES in step S1508), the signal handler performs the recovery processing on all the shared memories of the node 20 shared with the node where the abnormality occurs (step S1509). Then, the signal handler performs the recovery processing unique to the application (step S1510), and ends the processing. Also, when the node, where the abnormality occurs, does not attach the memory of the self node as the shared memory (NO in step S1508), the processing is ended.

Effect of First Embodiment

As described above, the information processing system 1 includes the plurality of nodes, each of which includes the memories 22 to 22c whose part may be set as the shared memory area, and the XB 2 connecting the plurality of nodes. Each of the plurality of nodes includes the abnormality detection units 37c and 42c that detect the abnormality of data transmission among the plurality of nodes or the abnormality of other nodes. Also, each of the plurality of nodes generates a value representing the abnormality registered in the "UE" item of the directory 36a, or the "poisoned TLP" packet, based on the abnormality detected by the abnormality detection units 37c and 42c. Also, each of the plurality of nodes generates an interrupt with respect to the processor within the node of the data transmission request issue source. Also, the OS executed by the CPU of each of the plurality of nodes performs the recovery processing when the interrupt is received.

That is, at least one node among the plurality of nodes includes the abnormality detection unit. The abnormality detection unit detects the abnormality in the data transmission path of the data transmission using the shared memory area sharable in the corresponding single node and another node, which is included in the storage unit provided in the corresponding single node or the corresponding another node. Also, the abnormality detection unit detects the abnormality in a certain node that may be included in the data transmission path of the data transmission using the shared memory area sharable in the corresponding single node and another node, which is included in the storage unit provided in the corresponding single node or the corresponding another node.

Also, at least one node among the plurality of nodes includes an error information generation unit that generates error information, based on the abnormality detected by the abnormality detection unit, and generates an interrupt with respect to the processor within the self node. Also, at least one node among the plurality of nodes performs the recovery processing, based on the error information according to the interrupt.

As described above, in the information processing system 1, even when the node of the communication partner is crashed during the data transmission, the OS executed in the CPU 21 to which the interrupt is notified performs the recovery processing on the shared memory of the self node, which has been shared by the crashed node. For this reason, even when the node of the communication partner is crashed and thus the partner node caches the data of the shared memory, the self node is not crashed. Therefore, according to the information processing system 1, even when the communication abnormality occurs between the nodes during the data transmission, all nodes are not always crashed like the related art. Therefore, according to the information processing system 1, when the abnormality related to the data transmission between the nodes occurs, the error influence range may be suppressed.

Also, according to the information processing system 1, the request of the target counting the time is switched by the pointers 80 and 90. Therefore, the time-out after the transmission of the request may be detected by the single timer 81 or 91.

Also, since the information processing system 1 determines whether the access target is the shared area or the local area, based on the received physical address, the information processing system 1 may maintain the high security level of the kernel data or the user data stored in the local area. Also, since the information processing system 1 makes all memories cacheable, the information processing system 1 may easily hide the latency in the memory access.

Also, the CPU 21 accesses the shared area of the memory accessed by other CPU in the same method as the case of accessing the memory 22. That is, the arithmetic unit 31 included in the CPU 21 has only to output the logical address when the storage area being the access target exists on either the memory 22 or other memory.

For this reason, even when processing or programming, such as an I/O exclusive control, is not performed, the CPU 21 may easily access the shared area. Therefore, the memory access performance may be improved. Also, the CPU 21 may appropriately use the shared memory, without modifying the program or the OS to be executed, and thus, the CPU 21 may perform the prefetch processing in the same manner as the related art. Therefore, the memory access performance may be improved.

Also, the CPU 21 sends a negative response when it is determined that the memory access target from other CPU is the access to the local area. Therefore, the information processing system 1 prevents the access to areas other than the shared area. As a result, the error may be prevented.

Also, by using the node map 34, the cache directory management unit 36 translates the physical address into the corresponding CPUID stored in the node map 34. Therefore, the CPU 21 may identify the CPU that accesses the memory allocated with the physical address being the access target.

Also, the CPU 21 performs the cache coherence control by using the directory that manages the CPU caching the data stored in the memory 22. Therefore, even when the number of the CPUs included in the information processing system 1 increases, the information processing system 1 may efficiently retain the cache coherence, without increasing the traffic of the XB 2.

Specifically, in the information processing system 1, the communication between the respective CPUs is limited to the communication between the remote CPU and the home CPU, or the communication among the remote CPU, the home CPU, and the local CPU caching the updated data. Therefore, the information processing system 1 may efficiently retain the cache coherence.

[b] Second Embodiment

Although the embodiments of the present invention have been described above, embodiments may be carried out in various forms other than the above-described embodiments. Accordingly, another embodiment included as a second embodiment in the present invention will be described below.

(1) Regarding Method for Detecting Abnormality of Node

Although the first embodiment described above exemplifies the case where the information processing system 1 detects the abnormality of the node by detecting the time-out of the request, the disclosed system is not limited thereto. For example, the disclosed system may detect the abnormality of the node by checking the status of the service processors between the mutually connected service processors at predetermined time intervals. Also, the disclosed system may detect the abnormality of the node by performing "alive check" between the nodes through the LAN at predetermined time intervals. With the request transmission timing, the abnormality of the node may be detected in an asynchronous manner.

Figure 34:
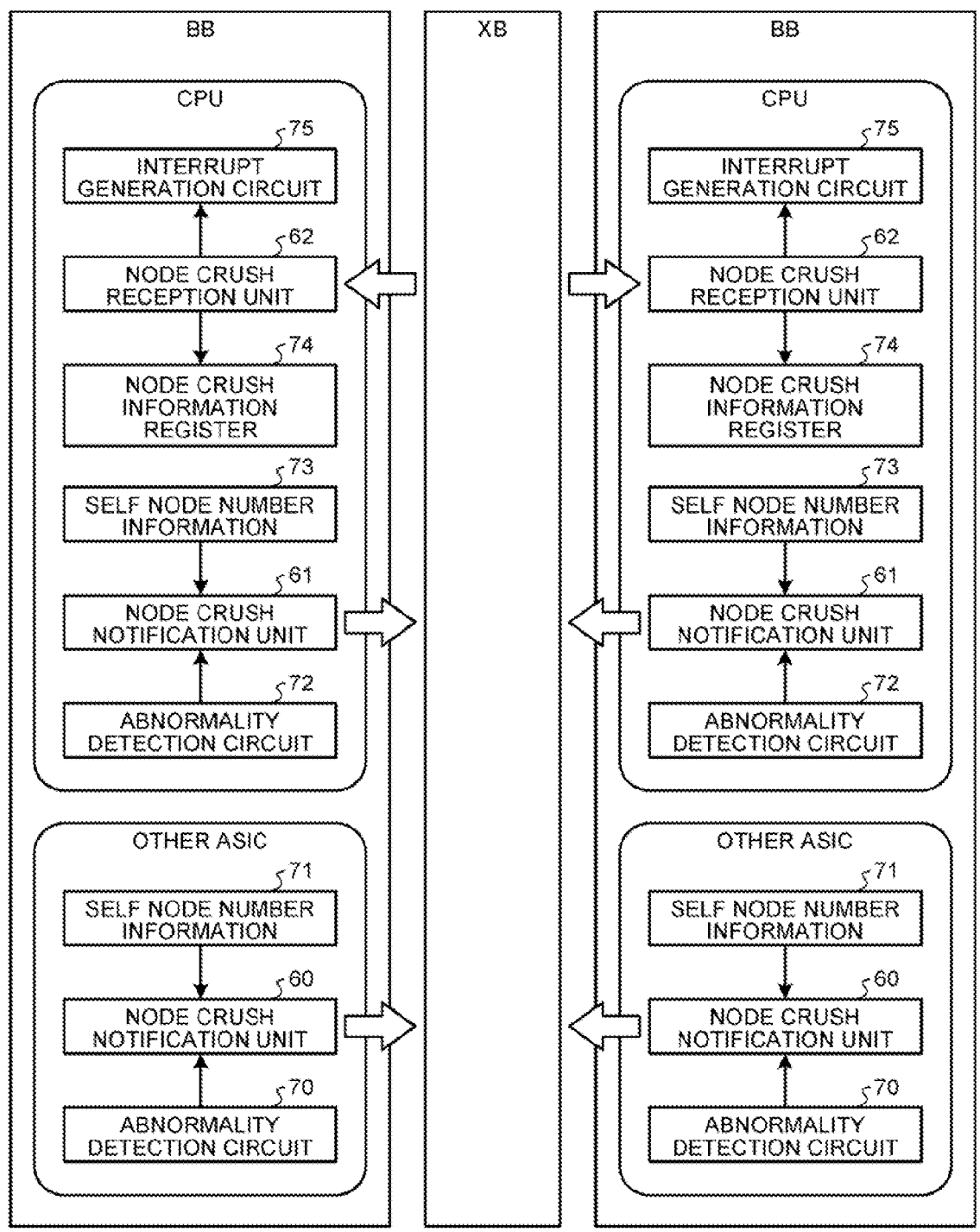
FIG. 34 is a schematic diagram of an information processing system, describing an example of a method for detecting node abnormality.

FIG. 34 is a schematic diagram of the information processing system, describing an example of the method for detecting the abnormality of the node. The example of FIG. 34 illustrates the case where a building box is represented by "BB". In the example of FIG. 34, the CPU of each BB includes an abnormality detection circuit 72, self node number information 73, a node crash notification unit 61, an interrupt generation circuit 75, a node crash reception unit 62, and a node shut-down information register 74.

The abnormality detection circuit 72 detects the abnormality of the self node. The self node number information 73 is information representing an identification number of the self node. When the abnormality of the self node is detected in the abnormality detection circuit 72, the node shut-down notification unit 61 transmits a node shut-down notification packet to the XB, the node shut-down notification packet including the type of the abnormality and the identification number of the self node, which is represented by the self node number information 73. Also, as an example of the type of the abnormality, there may be a node shut-down, a hang, and information representing in which CPU the abnormality occurs. Also, the information represented by the self node number information 73 may be any information that can identify the node. For example, in the case where the relation between the node and the CPU mounted on the node is predefined, the node number may be known from the CPUID. Therefore, the information represented by the self node number information 73 may be the CPUID.

When the node shut-down reception unit 62 receives the node shut-down notification packet transmitted from the XB, the node shut-down reception unit 62 sets the type of the abnormality and the identification number of the self node, which are included in the node shut-down notification packet, to the node shut-down information register 74. When the type of the abnormality and the identification number of the self node are set to the node shut-down information register 74, the software may cope with the abnormality by using the set information. Also, when the node shut-down reception unit 62 receives the node shut-down notification packet, the node shut-down reception unit 62 outputs a control signal for generating the interrupt in the interrupt generation circuit 75. When the interrupt generation circuit 75 receives the control signal from the node shut-down reception unit 62, the interrupt generation circuit 75 generates the interrupt as in the case of the first embodiment. Therefore, due to the interrupt, regarding the processing after the generation of the interrupt, the same processing as the first embodiment is performed.

In the example of FIG. 34, the ASIC of each BB includes an abnormality detection circuit 70, self node number information 71, and a node shut-down notification unit 60.

The abnormality detection circuit 70 detects the abnormality of the self node. The self node number information 71 is information representing an identification number of the self node. When the abnormality of the self node is detected in the abnormality detection circuit 70, the node shut-down notification unit 60 transmits a node shut-down notification packet to the XB, the node shut-down notification packet including the type of the abnormality and the identification number of the self node, which is represented by the self node number information 71.

The node shut-down notification units 60 and 61 may transmit node shut-down notification packets to a plurality of CPUs by transmitting a plurality of node shut-down notification packets to the XB. Also, the node shut-down notification units 60 and 61 may transmit a single node shut-down notification packet to the XB, and the XB may transmit the node shut-down notification packet to the plurality of CPUs. Also, the node shut-down notification units 60 and 61 may transmit a node shut-down notification packet to a single CPU at each node.

Figure 35:
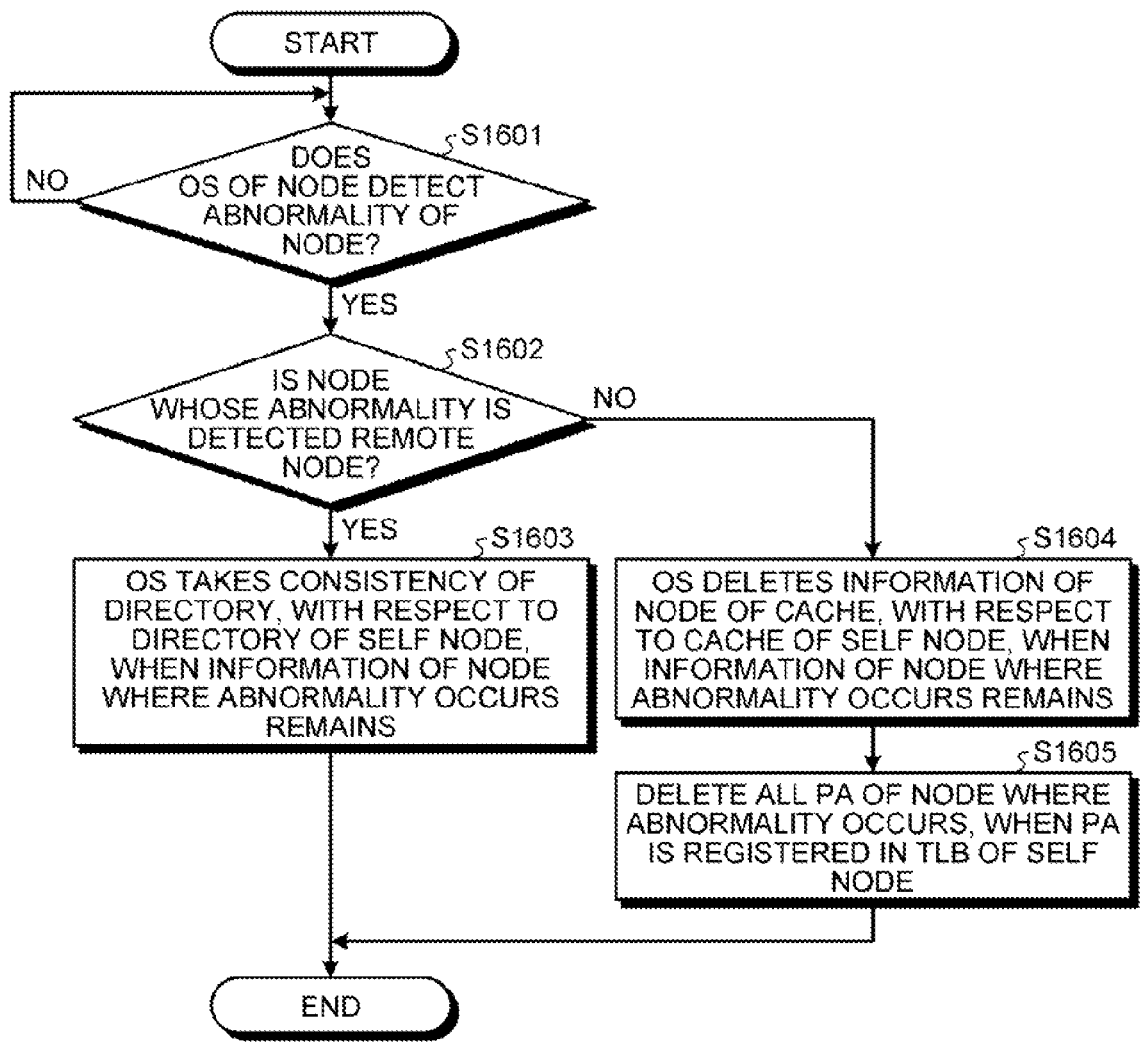
FIG. 35 is a flow chart describing a flow of processing in the case of using a method different from the abnormality detecting method of the first embodiment.

The flow of the processing when using a different method from the abnormality detecting method of the first embodiment will be described with reference to FIG. 35. FIG. 35 is a flow chart describing the flow of the processing when using a different method from the abnormality detecting method of the first embodiment. For example, by using any one of the abnormality detecting methods described in the second embodiment, the CPU 21 determines whether the abnormality of the node is detected (step S1601). When the abnormality of the node is not detected (NO in step S1601), the CPU 21 performs the determination in step S1601 again. On the other hand, when the abnormality of the node is detected (YES in step S1601), the CPU 21 determines whether the node where the abnormality is detected is a remote node (step S1602).

When the node where the abnormality is detected is the remote node (YES in step S1602), the OS executed by the CPU 21 performs the following processing. That is, on the directory 36*a* of the self node 20, when information of the node where the abnormality occurs remains, the OS takes the consistency of the directory 36*a* (step S1603), and ends the processing. Herein, an example of the method for taking the consistency of the directory will be described. For example, the CPU 21 performs the following processing when the crashed node caches data but the status of the cache is "clean". That is, the CPU 21 performs the recovery processing of changing the information of the directory 36*a* of the "clean" cache to a status in which the "crashed node has not cache". Also, the CPU 21 performs the following processing when the crashed node caches data and the status of the cache is "dirty". That is, the CPU 21 performs the recovery processing of changing the "dirty" cache line to an error state.

On the other hand, when the node where the abnormality is detected is not the remote node (NO in step S1602), the OS executed by the CPU 21 performs the following processing. That is, on the cache of the self node, when information of the node where the abnormality occurs remains, the OS deletes information of the node of the cache (step S1604). When the physical address of the node where the abnormality occurs is registered in the TLB 35a of the self node, the OS deletes all entries including the physical address of the node where the abnormality occurs (step S1605), and ends the processing.

Figure 36:
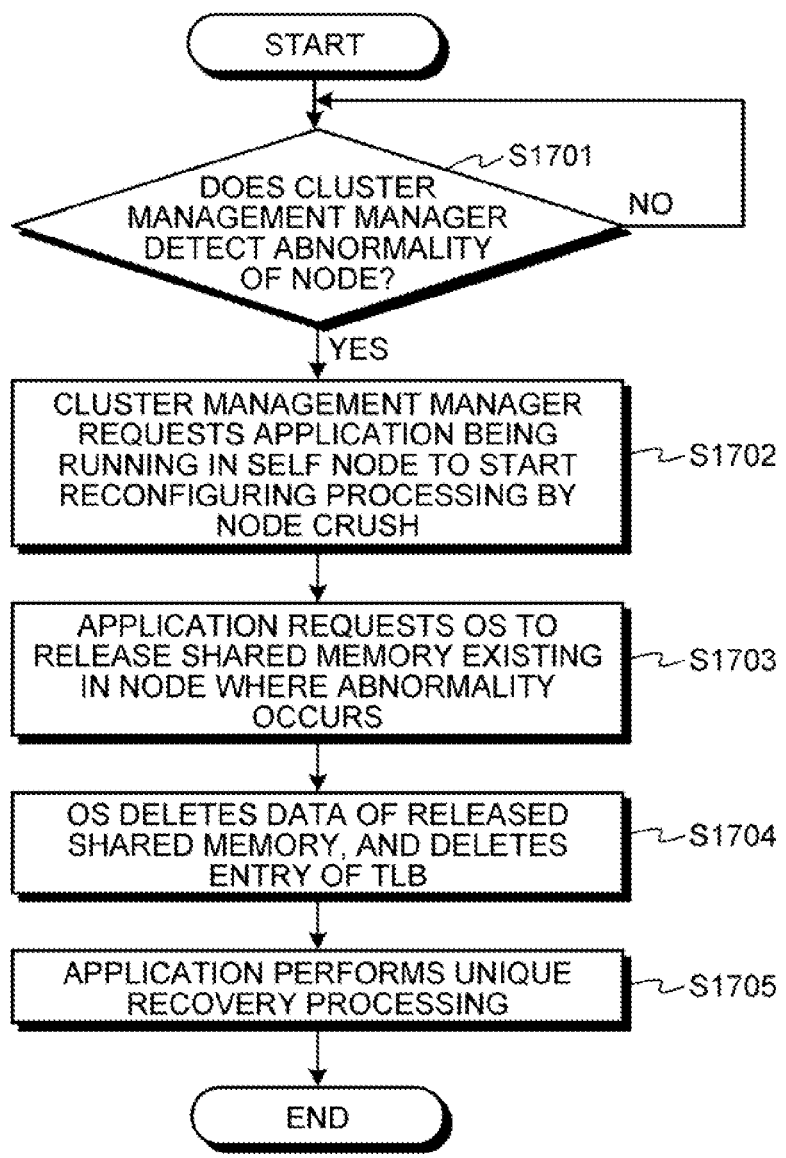
FIG. 36 is a flow chart describing a flow of processing in the case where a cluster management manager detects abnormality.

Then, in the information processing system 1, in the case of an application performing a cluster operation, a cluster management manager may detects a node shut-down in a cluster software. Therefore, the flow of the processing when the cluster management manager detects the abnormality will be described with reference to FIG. 36. FIG. 36 is a flow chart describing the flow of the processing when the cluster management manager detects the abnormality. For example, the cluster management manager determines whether the abnormality of the node is detected (step S1701). When the abnormality of the node is not detected (NO in step S1701), the cluster management manager performs the processing of step S1701 again.

On the other hand, when the abnormality of the node is detected (YES in step S1701), the cluster management manager requests the application being running in the self node to start the reconfiguring processing by the node shut-down (step S1702). Then, the application requests the OS to release the shared memory existing in the node where the abnormality occurs (step S1703). Then, the OS deletes the data of the released shared memory, and deletes the entry of the TLB (step S1704). The application performs the unique recovery processing (step S1705), and ends the processing.

(2) Regarding Building Block

The above-described information processing system 1 includes building blocks 10 to 10e having four CPUs. However, the embodiment is not limited to this, and the building blocks 10 to 10e may have an arbitrary number of CPUs and memories accessed by the respective CPUs. Also, the CPUs and the memories need not be 1:1 correspondence, and the CPUs directly accessing the memories may be a part of the entirety.

(3) Regarding Packet Transmitted by CPU

The above-described CPU 21 transmits the packet, including the CPUID and the PA, as the request of the memory access. However, the embodiment is not limited to this. That is, the CPU 21 may output a packet storing arbitrary information as long as the packet can uniquely identify the CPU accessing the memory being the access target.

Also, for example, the CPU 21 may convert the CPUID to a Virtual Connection (VC) ID, and stores the VCID. Also, the CPU 21 may store information, such as length representing the data length, in the packet.

(4) Regarding Order (Instruction) Issued by CPU

As described above, the respective CPUs 21 to 21c issue the request or order, and retain the cache coherence. However, the above-described request or order is merely exemplary. For example, the CPUs 21 to 21c may issue a Compare AndSwap (CAS) instruction.

As such, when the CPUs 21 to 21c issue the CAS instruction, the processing is performed on the each cache of the respective CPUs, even though the contention of the exclusive control frequently occurs among the plurality of CPUs. As a result, the CPUs 21 to 21c may prevent the delay caused by the occurrence of the memory access, and may prevent the transaction from becoming complex among the respective CPUs.

(5) Regarding Control Through Hypervisor

In the above-described information processing system 1, the example in which the access to the address translation unit 35 being hardware is performed by the OS has been described. However, the embodiment is not limited to this. For example, a hypervisor (HPV) operating a virtual machine may perform the access to the address translation unit 35.

In other words, in the node where the hypervisor operates, the OS requests the operation to the hypervisor, without directly performing the operation on hardware resources of the CPUs 21 to 21c, such as caches or MMUs. As such, when the respective CPUs 21 to 21c receives the control through the hypervisor, the respective CPUs 21 to 21c translate the virtual address into a real address (RA) and then translate the real address into a physical address.

Also, in the node where the hypervisor operates, the interrupt processing does not directly interrupt the OS, and performs the interrupt on the HPV. In this case, the hypervisor performs the interrupt by reading an interrupt processing handler of the OS. Also, the processing performed by the above-described hypervisor is known processing that is performed so as to operate the virtual machine.

(6) Regarding Processing Using Partition

The respective CPUs 21 to 21c in the above-described information processing system 1 transmit the memory access by using a single node map. However, the embodiment is not limited to this. For example, the respective building blocks 10 to 10e operate as a plurality of node groups, and a single logical partition operating the same firmware (hypervisor) may be configured at each node group.

In this case, the respective CPUs 21 to 21c include a node map representing the CPU of the access destination, and a node map representing the CPU within the same logical partition. As such, since the respective CPUs 21 to 21c include the node map representing the CPU included in the same logical partition, the respective CPUs 21 to 21c may identify a transmission range of a special packet that is not transmitted beyond the logical partition, such as an error occurrence notification, a shut-down request, or a reset request packet.

Figure 37:
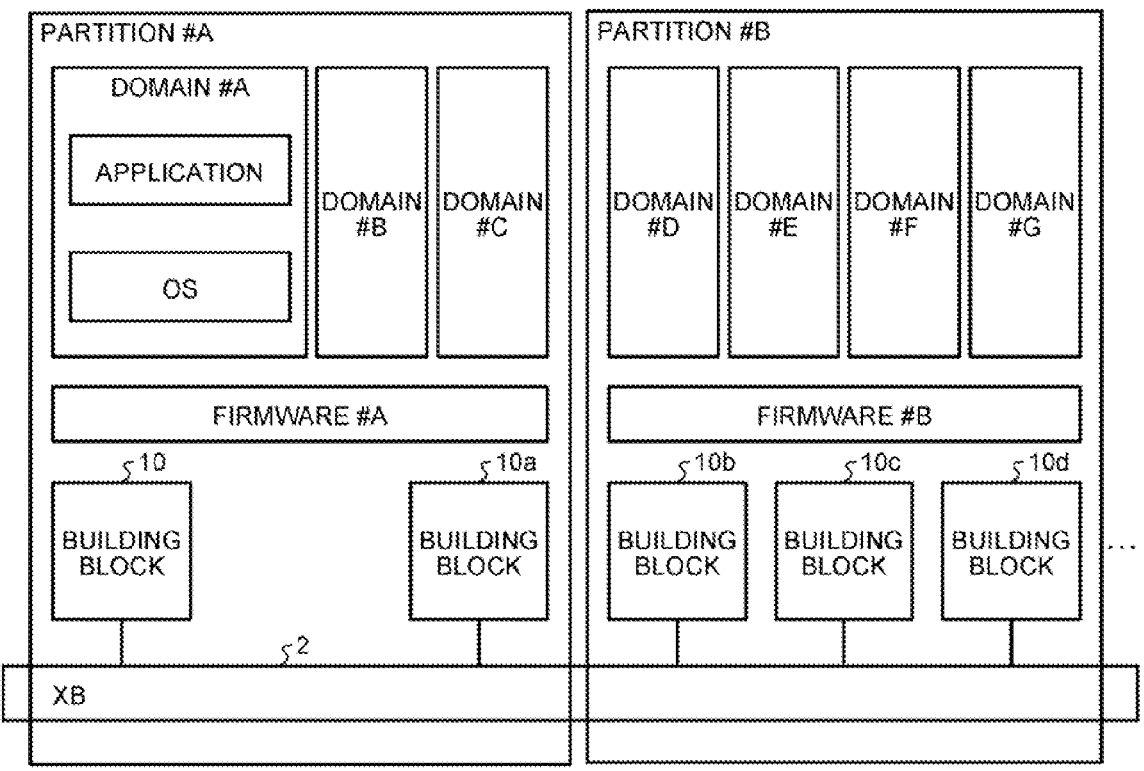
FIG. 37 is a diagram describing an example of an information processing system.

Hereinafter, the CPU including the node map representing the CPU included in the same logical partition will be described. FIG. 37 is a diagram describing an example of the information processing system. As illustrated in FIG. 37, the building blocks 10 and 10a operate a logical partition #A, and the building blocks 10b to 10d operate a logical partition #B.

Herein, in the logical partition #A, a plurality of domains #A to #C and a firmware #A are operated. Also, in the logical partition #B, a plurality of domains #D to #G and a firmware #B are operated. Also, the firmware #A and the firmware #B are, for example, hypervisors. Also, in the domain #A, the application and the OS are operated. As in the case of the domain #A, the application and the OS are operated in other domains #B to #G.

That is, the respective domains #A to #G are virtual machines in which the application and the OS independently operate. Herein, the respective CPUs 21 to 21c included in the building block 10 may transmit the above-described special packet to the respective CPUs included in the partition #A, but do not transmit the special packet to the respective CPUs included in the partition #B.

For this reason, the CPUs of the respective building blocks 10 to 10d include the node map representing the CPUIDs of the CPUs included in the same logical partition. For example, the CPU 21 includes the node map 34 in which the logical address and the CPUID of the CPU, which is connected to the memory having the storage area indicated by the physical address, are stored in association with each other. Also, the CPU 21 includes a node map 34a that stores the CPUIDs of the CPUs included in the same partition as the CPU 21, that is, the partition #A. Also, as in the case of the node map 34, the node map 34a is set by the service processor 24.

Figure 38:
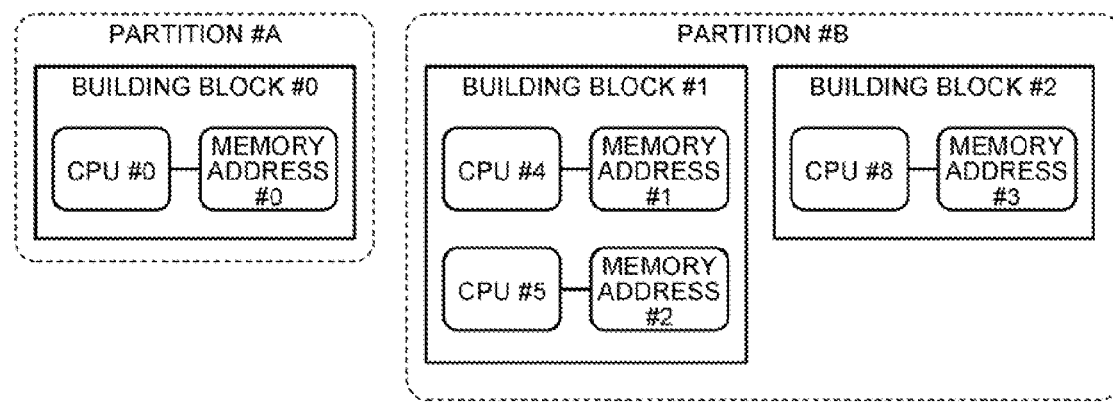
FIG. 38 is a diagram describing an example of a partition.

Hereinafter, an example of the node map representing the CPUIDs of the CPUs included in the same logical partition will be described with reference to the drawings. FIG. 38 is a diagram describing an example of a partition. For example, in the example illustrated in FIG. 38, the partition #A includes a building block #0. Also, the building block #0 includes a CPU #0 and a memory allocated with an address area #0.

Also, the building block #B includes a building block #1 and a building block #2. Also, the building block #1 includes a CPU #4, a CPU #5, a memory allocated with an address area "#1", and a memory allocated with an address area "#2". Also, the CPU #4 accesses the memory allocated with the address area "#1", and the CPU #5 accesses the memory allocated with the address area "#2". Also, the building block #2 includes a CPU #8 and a memory allocated with an address area "#3".

Next, the node map included in the CPU #0 and the node map included in the CPU #4, illustrated in FIG. 38, will be described with reference to FIGS. 39A to 39C. First, the node map stored by the CPU of the partition #A will be described with reference to FIGS. 39A and 39B. Also, FIG. 39A is a diagram describing an example of the node map stored by the CPU of the partition #A. Also, FIG. 39B is a diagram describing an example of the node map representing the partition #A.

Also, in the following description, a node ID of "0" represents the building block #0, and a node ID of "1" represents the building block #1. A node ID "2" represents the building block #2. Also, a CPUID of "0" is a CPUID of the CPU#0, a CPUID of "4" is a CPUID of the CPU #4, a CPUID of "5" is a CPUID of the CPU #5, and a CPUID of "8" is a CPUID of the CPU #8.

For example, in the example illustrated in FIG. 39A, the node map 34 represents that the address area "#0" exists in the building block #0, and the CPU #0 performs the access. Also, the node map 34 represents that the address area "#1" exists in the building block #1, and the CPU #4 performs the access. Also, the node map 34 represents that the address area "#2" exists in the building block #1, and the CPU #5 performs the access. Also, the node map 34 represents that the address area "#3" exists in the building block #2, and the CPU #8 performs the access.

Also, FIG. 39B illustrates the node map representing the partition #A. As illustrated in FIG. 39B, the node map representing the partition #A includes a valid, a node ID, and a CPUID at each entry. For example, in the example illustrated in FIG. 39B, the node map represents that the CPU #0 of the building block #0 is included in the partition #A.

For example, in the example illustrated in FIG. 38, the CPU#0 includes the node maps illustrated in FIGS. 39A and 39B. When performing the memory access, the CPU#0 identifies the CPU of the access destination by using the node map illustrated in FIG. 39A. On the other hand, when transmitting a special packet to only the CPU inside the same partition, the CPU #0 identifies the CPU of the transmission destination by using the node map illustrated in FIG. 39B. That is, the CPU #0 transmits the special packet to the CPU inside the partition #A represented by the node map that is exemplarily illustrated in FIG. 39B.

On the other hand, in order to perform the memory access, the CPU #4 includes the node map illustrated in FIG. 39A and the node map illustrated in FIG. 39C. FIG. 39C is a diagram describing an example of the node map representing the partition #B. In the example illustrated in FIG. 39C, the node map representing the partition #B represents that the CPU #4 and CPU #5 of the building block #1 and the CPU #8 of the building block #2 exist in the partition #B. The CPU #4 transmits the special packet to the CPU inside the partition #B represented by the node map that is exemplarily illustrated in FIG. 39C.

As such, the CPU #1 and the CPU #4 store the node map matching the address area and the CPUID, and the node map representing the partition. The CPU #1 and the CPU #4 directly perform the memory access on the memory included in another node, by using the node map matching the address area and the CPUID. Also, the CPU #1 transmits the special packet by using the node map representing the partition #A. Also, the CPU #4 transmits the special packet by using the node map representing the partition #B.

As such, the respective CPUs may include the node maps having different values at each partition including the CPUs themselves. Also, when the respective CPUs include the node maps having different values at each partition including the CPUs themselves, the respective CPUs may prevent transmission of the special packet beyond the partition.

Also, as in the case of the above-described embodiment, the respective CPUs may represent the address area being the access target by the start address and the address mask, or by the start address and the length. That is, the CPU #1 and the CPU #4 identify the node being the access target by using the node map representing the address area being the access target by using the start address and the address mask, or by the start address and the length. Also, the CPU #1 and the CPU #4 transmit the special packet by using the node maps representing the different partitions.

(7) Regarding Control Through Service Processor

In the above-described information processing system 1, the example in which the access to the node map 34 being hardware is performed by the service processor 24 has been described. However, the embodiment is not limited this, and components other than the service processor 24 may be configured to access the node map 34. For example, the basic firmware (Basic Input/Output System: BIOS) or HPV operating on one or all of the CPUs 21 to 21c may be configured to perform the access to the node map 34.

According to an embodiment of the present invention, when abnormality related to data transmission between nodes occurs, an error influence range may be suppressed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a plurality of nodes each including a storage device; and
an interconnect that connects the plurality of nodes,
wherein at least one node among the plurality of nodes includes:
a first processor that
detects abnormality in a data transmission path of data transmission using a shared memory area sharable in the one node and another node, which is included in a storage device provided in the one node or the another node, or abnormality in a certain node included in a data transmission path of data transmission using a shared memory area sharable in the one node and the another node, which is included in a storage device provided in the one node or the another node,
> generates error information, based on the detected abnormality, and
> generates an interrupt with respect to a processor within the one node;
a second processor that performs recovery processing, based on the error information according to the interrupt; and
a cache memory that caches data, and
when the second processor receives the interrupt, the second processor deletes the data cached in the cache memory, when performing the recovery processing, based on the generated error information.

2. The information processing apparatus according to claim 1, wherein,
the one node further includes:
a pointer that indicates information representing a request of data transmission, in which data corresponding to a request of data transmission to a node of a data transmission request issue source is not transmitted, among information representing a plurality of requests of the data transmission; and
a timer that counts a time after issuing a request of data transmission represented by information indicated by the pointer, and
the first processor detects the abnormality of data transmission between the nodes, when the time counted by the timer has passed by a predetermined time, before the node of the data transmission request issue source receives data corresponding to the request of the data transmission.

3. The information processing apparatus according to claim 2, wherein,
the first processor controls communication between the second processor and other node and transmits the request of the data transmission to a node of an access destination of the data transmission according to an instruction from the second processor,
the timer counts a time after the first processor the request of the data transmission, and
the first processor detects the abnormality of data transmission between the nodes, when the time counted by the timer has passed by a predetermined time, before the node of the data transmission request issue source receives data corresponding to the request of the data transmission.

4. The information processing apparatus according to claim 1, wherein the first processor detects abnormality of data transmission between the nodes upon receiving a negative response.

5. The information processing apparatus according to claim 2, wherein,
the first processor controls an I/O device and transmits the request of the data transmission to a node of an access destination of the data transmission according to an instruction from the I/O device,
the timer counts a time after the first processor transmits the request of the data transmission, and
the first processor detects the abnormality of data transmission between the nodes, when the time counted by the timer has passed by a predetermined time, before the node of the data transmission request issue source receives data corresponding to the request of the data transmission.

6. An information processing apparatus comprising:
a plurality of nodes each including a storage device; and
an interconnect that connects the plurality of nodes,
wherein at least one node among the plurality of nodes includes:
a first processor that
detects abnormality in a data transmission path of data transmission using a shared memory area sharable in the one node and another node, which is included in a storage device provided in the one node or the another node, or abnormality in a certain node included in a data transmission path of data transmission using a shared memory area sharable in the one node and the another node, which is included in a storage device provided in the one node or the another node,
generates error information, based on the detected abnormality, and
generates an interrupt with respect to a processor within the one node;
a second processor that performs recovery processing, based on the error information according to the interrupt; and
a cache memory that caches data, and
the first processor generates the error information, and writes the error information in a cache directory including information on the data cached in the cache memory.

7. An information processing apparatus comprising:
a plurality of nodes each including a storage device; and
an interconnect that connects the plurality of nodes,
wherein at least one node among the plurality of nodes includes:
a first processor that
detects abnormality in a data transmission path of data transmission using a shared memory area sharable in the one node and another node, which is included in a storage device provided in the one node or the another node, or abnormality in a certain node included in a data transmission path of data transmission using a shared memory area sharable in the one node and the another node, which is included in a storage device provided in the one node or the another node,
generates error information, based on the detected abnormality, and
generates an interrupt with respect to a processor within the one node;
a second processor that performs recovery processing, based on the error information according to the interrupt; and
a cache memory that caches data, and
the first processor generates error information, based on abnormality of other node detected by the first processor, and writes the error information in a shared memory accessed by the other node.

8. The information processing apparatus according to claim 5, wherein the one node includes a cache memory that caches data, and
the first processor generates the error information, and controls the I/O device to detect error by transmitting the error information to the I/O device.

9. An information processing apparatus comprising:
a plurality of nodes each including a storage device; and
an interconnect that connects the plurality of nodes, wherein at least one node among the plurality of nodes includes:
a first processor that
detects abnormality in a data transmission path of data transmission using a shared memory area sharable in the one node and another node, which is included in a storage device provided in the one node or the another node, or abnormality in a certain node included in a data transmission path of data transmission using a shared memory area sharable in the one node and the another node, which is included in a storage device provided in the one node or the another node,
generates error information, based on the detected abnormality, and
generates an interrupt with respect to a processor within the one node; and
a second processor that performs recovery processing, based on the error information according to the interrupt,
the second processor translates a logical address of a storage device accessed by an application, which is generated by the application, into a physical address of the storage device, by using a table in which a logical address and a physical address are registered in association with each other, and,
when abnormality is detected by the first processor, the second processor dissolves matching a physical address of a storage device included in a node corresponding to the abnormality, and a logical address corresponding to the physical address in the table.

10. The information processing apparatus according to claim 6, wherein when a node whose abnormality is detected by the first processor is a remote node, the second processor takes consistency of information of the cache directory.

11. An information processing apparatus comprising:
a plurality of nodes each including a storage device; and
an interconnect that connects the plurality of nodes,
wherein at least one node among the plurality of nodes includes:
a first processor that
detects abnormality in a data transmission path of data transmission using a shared memory area sharable in the one node and another node, which is included in a storage device provided in the one node or the another node, or abnormality in a certain node included in a data transmission path of data transmission using a shared memory area sharable in the one node and the another node, which is included in a storage device provided in the one node or the another node,
generates error information, based on the detected abnormality, and
generates an interrupt with respect to a processor within the one node; and
a second processor that performs recovery processing, based on the error information according to the interrupt, and
the second processor notifies a signal to a single handler corresponding to a shared memory of a node whose abnormality is detected by the first processor.

12. A non-transitory computer-readable recording medium having stored therein a control program causing at least one node of a plurality of nodes in an information processing device which comprises: the plurality of nodes; and an interconnect that connects between the plurality of nodes to execute processing of:
detecting abnormality in a data transmission path of data transmission using a shared memory area sharable in the one node and another node, which is included in a storage device provided in the one node or the another node, or abnormality in a certain node included in a data transmission path of data transmission using a shared memory area sharable in the one node and the another node, which is included in a storage device provided in the one node or the another node;
generating error information, based on the detected abnormality, and generating an interrupt with respect to a processor within a self node;
performing recovery processing, based on the error information according to the interrupt; and
when receiving the interrupt, deleting data cached in a cache memory, when performing the recovery processing, based on the generated error information.

13. A control method of at least one node of a plurality of nodes in an information processing device which comprises: the plurality of nodes; and an interconnect that connects between the plurality of nodes, of executing processing of:
detecting abnormality in a data transmission path of data transmission using a shared memory area sharable in the one node and another node, which is included in a storage device provided in the one node or the another node, or abnormality in a certain node included in a data transmission path of data transmission using a shared memory area sharable in the one node and the another node, which is included in a storage device provided in the one node or the another node;
generating error information, based on the detected abnormality, and generating an interrupt with respect to a processor within a self node;
performing recovery processing, based on the error information according to the interrupt; and
when receiving the interrupt, deleting data cached in a cache memory, when performing the recovery processing, based on the generated error information.

* * * * *